United States Patent
Yamano et al.

(10) Patent No.: US 8,123,307 B2
(45) Date of Patent: Feb. 28, 2012

(54) BRAKE BOOST CONTROL APPARATUS

(75) Inventors: Kazuya Yamano, Atsugi (JP); Takanobu Saito, Kamakura (JP); Satoru Kuragaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 12/249,187

(22) Filed: Oct. 10, 2008

(65) Prior Publication Data

US 2009/0096280 A1   Apr. 16, 2009

(30) Foreign Application Priority Data

Oct. 12, 2007   (JP) ................. 2007-266090

(51) Int. Cl.
*B60T 13/18*   (2006.01)
(52) U.S. Cl. .......................................... 303/11; 303/155
(58) Field of Classification Search .................. 303/10, 303/11, 113.2–113.4, 114.1, 114.3, 155
See application file for complete search history.

(56) References Cited

U.S. PATENT DOCUMENTS

| | | | | |
|---|---|---|---|---|
| 4,887,869 A | * | 12/1989 | Nishii et al. ................ | 303/114.1 |
| 2002/0063469 A1 | * | 5/2002 | Nishio .............................. | 303/4 |
| 2003/0137192 A1 | * | 7/2003 | Hano et al. ..................... | 303/192 |
| 2006/0049687 A1 | * | 3/2006 | Iizuka et al. ..................... | 303/11 |
| 2006/0119173 A1 | * | 6/2006 | Kokubo ............................ | 303/16 |
| 2006/0214504 A1 | * | 9/2006 | Kusano ....................... | 303/113.4 |
| 2008/0093919 A1 | | 4/2008 | Klug et al. | |
| 2008/0100129 A1 | * | 5/2008 | Lubbers ..................... | 303/113.1 |

FOREIGN PATENT DOCUMENTS

| | | |
|---|---|---|
| DE | 199 40 263 A1 | 3/2001 |
| DE | 103 20 175 A1 | 12/2004 |
| DE | 10 2004 045 391 A1 | 3/2006 |
| JP | 2000-085561 A | 3/2000 |

\* cited by examiner

*Primary Examiner* — Christopher Schwartz
(74) *Attorney, Agent, or Firm* — Foley & Lardner LLP

(57) ABSTRACT

A brake boost control apparatus has a brake operation member, a master cylinder, a wheel cylinder, a hydraulic pump, a master cylinder pressure detection section detecting a pressure of the brake fluid, a brake stroke amount detection section detecting a stroke amount of the brake operation member, a hydraulic pressure control section that controls a pressure of the wheel cylinder, a boost section which boosts the pressure of the brake fluid and increases the wheel cylinder pressure, and a control unit. The control unit controls at least one of the hydraulic pump and the hydraulic pressure control section so that the stroke amount detected by the brake stroke amount detection section under a boost operation by the boost section and the pressure detected by the master cylinder pressure detection section are maintained at a predetermined relationship.

12 Claims, 10 Drawing Sheets

BOOST MAP

HYDRAULIC PRESSURE RIGIDITY MAP
(FLUID AMOUNT-HYDRAULIC PRESSURE CONVERSION)

CONTROL MODE JUDGE

CORRECTION CONTROL BY F-S CHARACTERISTIC

GATE-OUT VALVE CURRENT-DIFFERENTIAL
PRESSURE CHARACTERISTIC MAP

SCHEMATIC VIEW OF
GATE-OUT VALVE STRUCTURE

BRAKE BOOST CONTROL APPARATUS

BACKGROUND OF THE INVENTION

The present invention relates to a brake boost control apparatus that boosts an operation force of a brake pedal by a driver and produces a large wheel cylinder pressure.

In recent years, there have been proposed and developed various brake systems having a brake booster that boosts an operation force of a brake pedal depressed by a driver and produces a large wheel cylinder pressure. As the brake booster, a negative pressure booster using an engine negative pressure and a hydraulic pressure booster using an accumulator are used frequently. However, systems of these boosters are large, and this is one of the drawbacks to these brake systems. A braking force control apparatus has therefore been proposed in Japanese Patent Provisional Publication No. 2000-085561 (hereinafter is referred to as "JP2000-085561"). JP2000-085561 discloses the braking force control apparatus in which when detecting a brake pedal operation by the driver, a hydraulic pump installed in an anti-lock braking system is worked, and a larger wheel cylinder pressure than a pressure produced by the brake pedal operation force is produced.

SUMMARY OF THE INVENTION

In the case of the braking force control apparatus (brake boost control apparatus) in JP2000-085561, however, since the pump draws a brake fluid from a master cylinder into a wheel cylinder (hereinafter, this system is called an inline system), a relationship between a master cylinder pressure and a brake pedal stroke changes. That is, in this braking force control apparatus, the relationship between the master cylinder pressure and the brake pedal stroke cannot be maintained, then this gives an awkward feeling to the driver when the driver operates the brake pedal.

It is therefore an object of the present invention to provide a brake boost control apparatus that boosts the brake pedal operation force without causing the awkward feeling to the driver even when employing the inline system.

According to one aspect of the present invention, a brake boost control apparatus comprises: a brake operation member by which a driver performs a braking operation; a master cylinder which is connected with the brake operation member and produces a pressure in a brake fluid; a wheel cylinder which is installed at each wheel and produces a braking force to the wheel by the brake fluid in the master cylinder; a hydraulic pump which draws the brake fluid from the master cylinder and discharges the brake fluid to a wheel cylinder side; a master cylinder pressure detection section which is installed between the master cylinder and a suction side of the hydraulic pump and detects a pressure of the brake fluid which is produced by the operation of the brake operation member; a brake stroke amount detection section that detects a stroke amount of the brake operation member; a hydraulic pressure control section that controls a pressure of the wheel cylinder together with the hydraulic pump; a boost section which boosts the pressure of the brake fluid, produced by the master cylinder, by the hydraulic pump and increases the wheel cylinder pressure; and a control unit that controls at least one of the hydraulic pump and the hydraulic pressure control section so that the stroke amount detected by the brake stroke amount detection section under a boost operation by the boost section and the pressure detected by the master cylinder pressure detection section are maintained at a predetermined relationship.

According to another aspect of the present invention, a brake boost control apparatus comprises: a brake operation member that works by a driver's braking operation; a master cylinder which works by the brake operation member and produces a pressure in a brake fluid; a wheel cylinder which is installed at each wheel and produces a braking force to the wheel; a hydraulic pump which is used for a pressure increase control of the wheel cylinder by drawing the brake fluid from the master cylinder and discharging the brake fluid to a wheel cylinder side; a pressure detection section which is installed between the master cylinder and a suction side of the hydraulic pump and detects a pressure of the brake fluid which is produced by the brake operation member; a brake stroke amount detection section which is installed between the brake operation member and the master cylinder and detects a stroke amount of the brake operation member; a boost section which boosts the pressure of the brake fluid, produced by the brake operation member, by the hydraulic pump and increases the wheel cylinder pressure; and a control unit that selectively changes controls of the wheel cylinder pressure of the pressure increase control/a hold control/a pressure decrease control on the basis of the stroke amount detected by the brake stroke amount detection section under a boost operation by the boost section and the pressure of the brake fluid detected by the pressure detection section.

According to a further aspect of the invention, a brake boost control apparatus comprises: a booster having a hydraulic pump which draws a brake fluid from a master cylinder and increases a pressure of a wheel cylinder in a vehicle at least at a driver's braking operation; a control valve that controls the wheel cylinder pressure together with the hydraulic pump; and a control unit that controls control quantities of the hydraulic pump and the control valve so that a stroke amount of a brake pedal when boosted by the booster and a master cylinder pressure are maintained at a predetermined relationship.

According to a still further aspect of the invention, a brake boost control apparatus comprises: a brake operation member by which a driver performs a braking operation; a master cylinder which is connected with the brake operation member and produces a pressure in a brake fluid; a wheel cylinder which is installed at each wheel and produces a braking force to the wheel by the brake fluid in the master cylinder; a hydraulic pump which draws the brake fluid from the master cylinder and discharges the brake fluid to a wheel cylinder side; a master cylinder pressure detection section which is installed between the master cylinder and a suction side of the hydraulic pump and detects a pressure of the brake fluid which is produced by the operation of the brake operation member; a brake stroke amount detection section that detects a stroke amount of the brake operation member; a hydraulic pressure control section that controls a pressure of the wheel cylinder together with the hydraulic pump; a boost section which boosts the pressure of the brake fluid, produced by the master cylinder, by the hydraulic pump and increases the wheel cylinder pressure; and a control unit that controls the hydraulic pump when increasing the wheel cylinder pressure and controls the hydraulic pressure control section when decreasing the wheel cylinder pressure so that the stroke amount detected by the brake stroke amount detection section under a boost operation by the boost section and the pressure detected by the master cylinder pressure detection section are maintained at a predetermined relationship.

According to a still further aspect of the invention, a brake boost control apparatus comprises: a booster having a hydraulic pump which draws a brake fluid from a master cylinder and increases a pressure of a wheel cylinder in a vehicle at least at a driver's braking operation; a control valve that controls the wheel cylinder pressure together with the hydraulic pump; and a control unit that controls the hydraulic pump when increasing the wheel cylinder pressure and controls a control quantity of the control valve when decreasing the wheel cylinder pressure so that a stroke amount of a brake pedal when boosted by the booster and a master cylinder pressure are maintained at a predetermined relationship.

In the present invention, a hydraulic pump and/or a hydraulic pressure control section are controlled so that a stroke amount of the brake pedal and the master cylinder pressure are maintained at a predetermined relationship. With this control, the boost control without causing the awkward feeling to the driver can be achieved.

The other objects and features of this invention will become understood from the following description with reference to the accompanying drawings.

DETAILED DESCRIPTION OF THE INVENTION

Embodiments of a brake boost control apparatus will be explained below with reference to the drawings.

First Embodiment

A brake boost control apparatus of the first embodiment has a motor, pumps, electromagnetic valves and sensors and others. This brake boost control apparatus is a brake booster in which elements or components are mechanically and electrically combined, and has a hydraulic unit 31 installed between a master cylinder M/C and a wheel cylinder W/C and has a control unit CU connected to this hydraulic unit 31 and controlling each element or component. However, this configuration or structure is not limited to this combination. The hydraulic unit 31 and the control unit CU could be separated from each other.

[Brake Pipe Arrangement]

Figure 1:
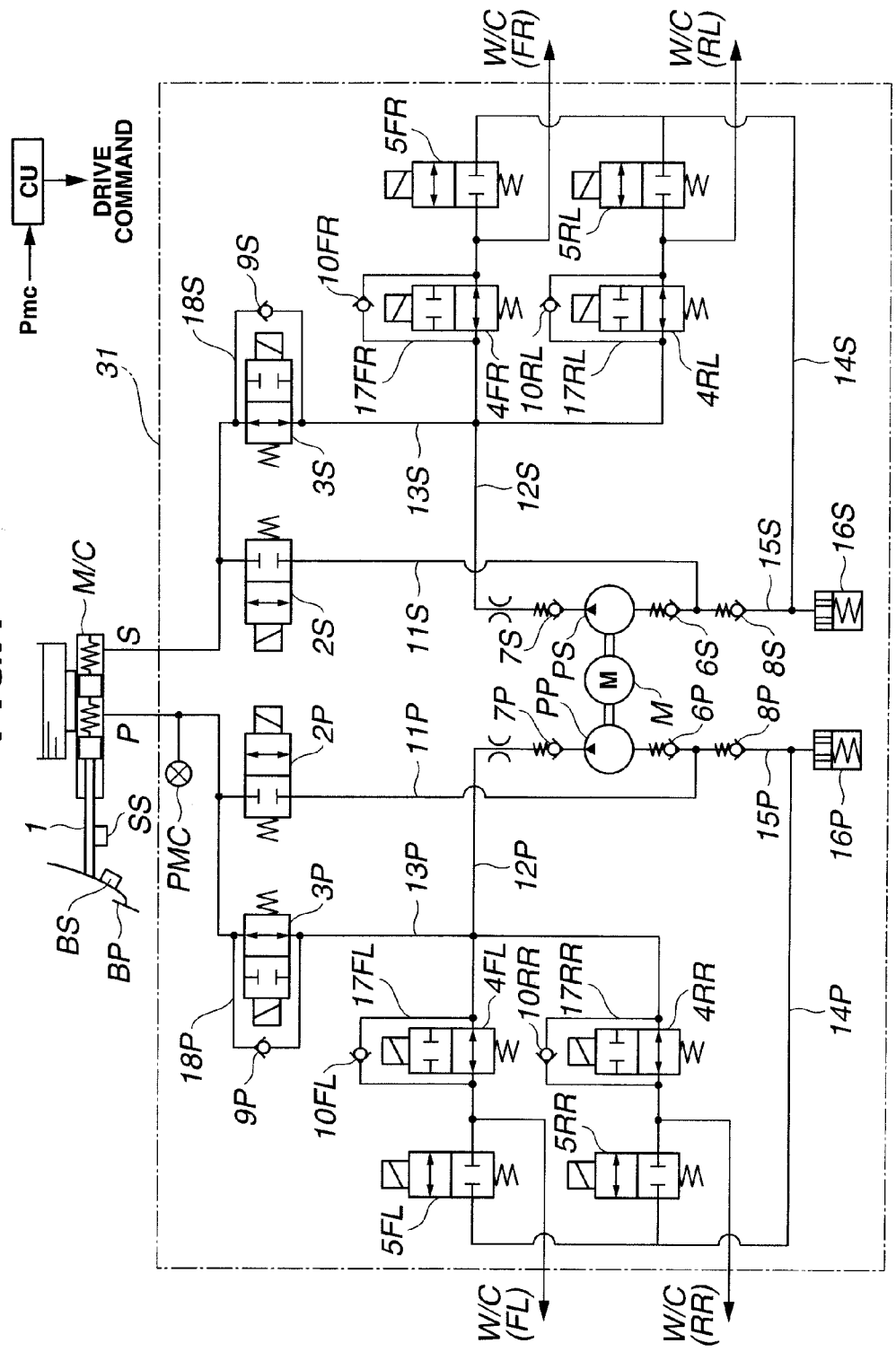
FIG. 1 is a hydraulic circuit of a brake system using a brake boost control apparatus of a first embodiment.

FIG. 1 is a hydraulic circuit of a brake system using the brake boost control apparatus. In this brake system, so-called an X-piping arrangement (x-pipe system) or a diagonal piping arrangement (diagonal system) is used, and two line pipes of P line pipe and S line pipe are arranged.

The P line pipe is connected to a wheel cylinder W/C (FL) of a left front (FL) wheel and a wheel cylinder W/C (RR) of a right rear (RR) wheel. The S line pipe is connected to a wheel cylinder W/C (FR) of a right front (FR) wheel and a wheel cylinder W/C (RL) of a left rear (RL) wheel. As shown in FIG. 1, a pump PP is provided in the P line pipe, and a pump PS is provided in the S line pipe. These pumps PP and PS are driven by one motor M. Here, this pipe configuration could be possible by one pump and one motor. Furthermore, a plunger pump or a gear pump might be used as the pump.

A brake pedal BP is connected to the master cylinder M/C via an input rod 1. The brake pedal BP is provided with a brake switch BS that detects an operation state of the brake pedal BP. The input rod 1 is provided with a stroke sensor SS that detects a stroke amount of the brake pedal BP.

The master cylinder M/C and each suction side of the pumps PP and PS (hereinafter, simply described as the pump P) are connected by pipes 11P and 11S (hereinafter, simply described as the pipe 11 (corresponding to a third brake circuit)). On the each pipe 11, gate-in valves 2P and 2S of a normally-closed electromagnetic valve are provided. Between the master cylinder M/C and the gate-in valve 2P, a pressure sensor PMC that detects a hydraulic pressure of the master cylinder M/C is installed.

Further, between the gate-in valves 2P and 2S (hereinafter, simply described as the gate-in valve 2) and the pump P in the pipe 11, check valves 6P and 6S (hereinafter, simply described as the check valve 6) are provided. This check valve 6 allows a flow of brake fluid in a direction from the gate-in valve 2 toward the pump P, and forbids a brake fluid flow of the opposite direction.

On the other hand, a discharge or delivery side of the each pump P and the each wheel cylinder W/C are connected by pipes 12P and 12S (hereinafter, simply described as the pipe 12 (corresponding to a second brake circuit)). On the each pipe 12, solenoid-in valves 4FL, 4RR, 4FR and 4RL (hereinafter, simply described as the solenoid-in valve 4) of a normally-open electromagnetic valve are provided. These solenoid-in valves 4FL, 4RR, 4FR and 4RL belong to the respective wheel cylinders of W/C (FL), W/C (RR), W/C (FR) and W/C (RL), as illustrated in FIG. 1.

Further, between the each solenoid-in valve 4 and the pump P in the pipe 12, check valves 7P and 7S (hereinafter, simply described as the check valve 7) are provided. This check valve 7 allows a flow of the brake fluid in a direction from the pump P toward the solenoid-in valve 4, and forbids a brake fluid flow of the opposite direction.

Furthermore, pipes 17FL, 17RR, 17FR and 17RL (hereinafter, simply described as the pipe 17) are provided on the each pipe 12. As shown in FIG. 1, the pipe 17 bypasses the respective solenoid-in valves 4. On the each pipe 17, check valves 10FL, 10RR, 10FR and 10RL (hereinafter, simply described as the check valve 10) are provided. This check valve 10 allows a flow of the brake fluid in a direction from the wheel cylinder W/C toward the pump P, and forbids a brake fluid flow of the opposite direction.

The master cylinder M/C and the each pipe 12 are connected by pipes 13P and 13S ((hereinafter, simply described as the pipe 13 (corresponding to a first brake circuit)). The pipe 12 and the pipe 13 meet between the pump P and the solenoid-in valve 4. On the each pipe 13, gate-out valves 3P and 3S (hereinafter, simply described as the gate-out valve 3) of a normally-open electromagnetic valve are provided. Here, with regard to the pipe 13, a section on a side of the master cylinder M/C from the gate-out valve 3 is called a master cylinder side pipe 13a, and a section on a side of the wheel cylinder W/C from the gate-out valve 3 is called a wheel cylinder side pipe 13b.

As can be seen in FIG. 1, pipes 18P and 18S (hereinafter, simply described as the pipe 18) are provided on the respective pipes 13. This pipe 18 bypasses the gate-out valve 3. On the each pipe 18, check valves 9P and 9S (hereinafter, simply described as the check valve 9) are provided. This check valve 9 allows a flow of the brake fluid in a direction from the master cylinder M/C toward the wheel cylinder W/C, and forbids a brake fluid flow of the opposite direction.

In the hydraulic circuit, reservoir 16P and 16S (hereinafter, simply described as the reservoir 16) are also installed at the suction side of the pump P. The each reservoir 16 and the each pump P are connected by pipes 15P and 15S (hereinafter, simply described as the pipe 15) respectively. Between the reservoir 16 and the pump P, check valves 8P and 8S (hereinafter, simply described as the check valve 8) are provided. This check valve 8 allows a flow of the brake fluid in a direction from the reservoir 16 toward the pump P, and forbids a brake fluid flow of the opposite direction.

The wheel cylinder W/C and the pipe 15 are connected by pipes 14P and 14S (hereinafter, simply described as the pipe 14 (corresponding to a fourth brake circuit)). The pipe 14 and the pipe 15 meet between the check valve 8 and the reservoir 16. On the each pipe 14, solenoid-out valves 5FL, 5RR, 5FR and 5RL (hereinafter, simply described as the solenoid-out valve 5) of a normally-closed electromagnetic valve are provided.

Figure 2:
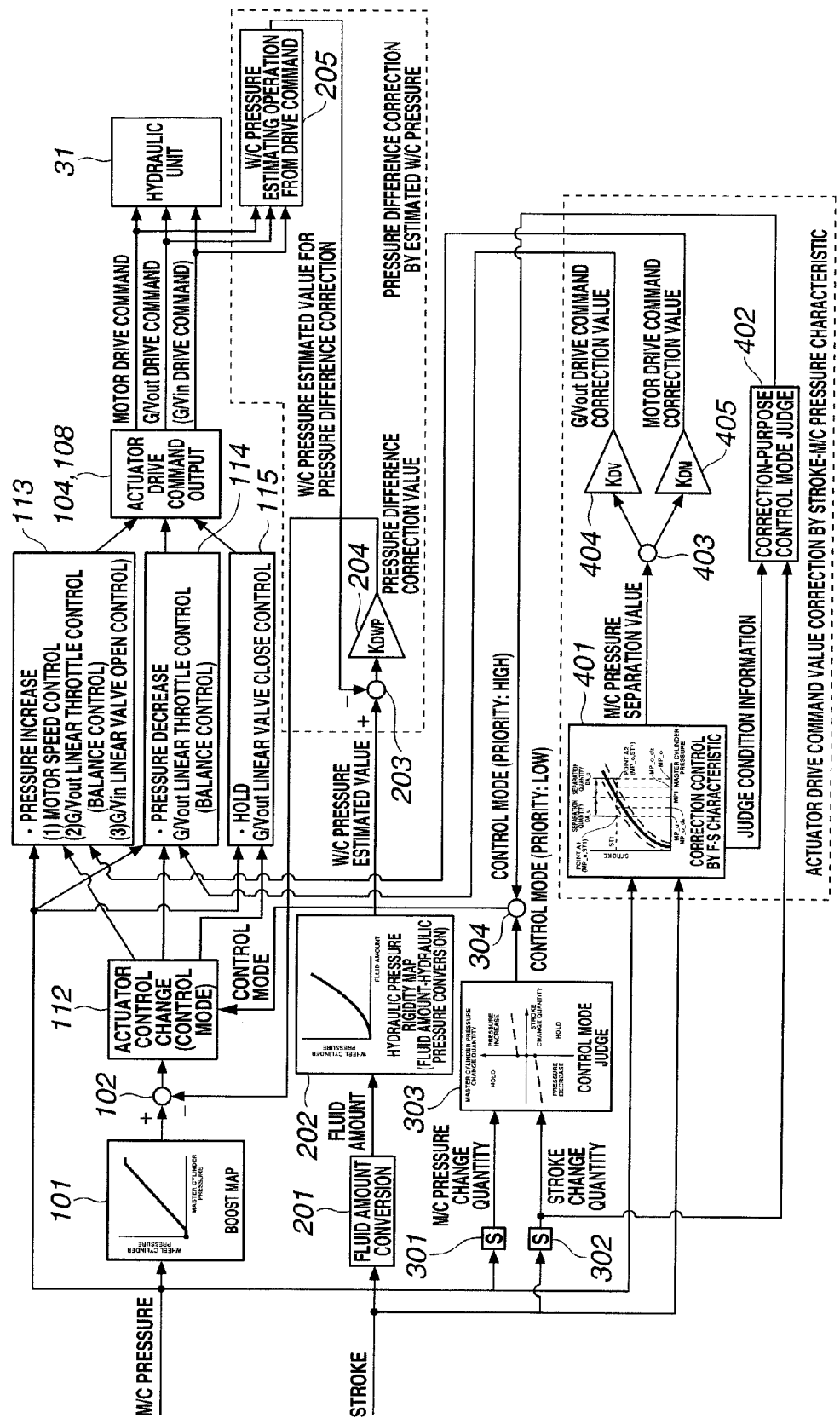
FIG. 2 is a block diagram showing a configuration of control in a controller of the brake boost control apparatus of the first embodiment.

FIG. 2 is a block diagram showing a configuration of control in the control unit CU of the brake boost control apparatus of the first embodiment. This control unit CU inputs signals from the pressure sensor PMC and the stroke sensor SS and outputs drive command values to the motor M, the gate-out valve 3 and the gate-in valve 2. FIG. 2 illustrates only the configuration of the control unit CU from this input to output. With respect to drive command values of controls of other electromagnetic valves (the solenoid-in valve 4 and the solenoid-out valve 5), they are output appropriately from other control logics.

Figure 3:
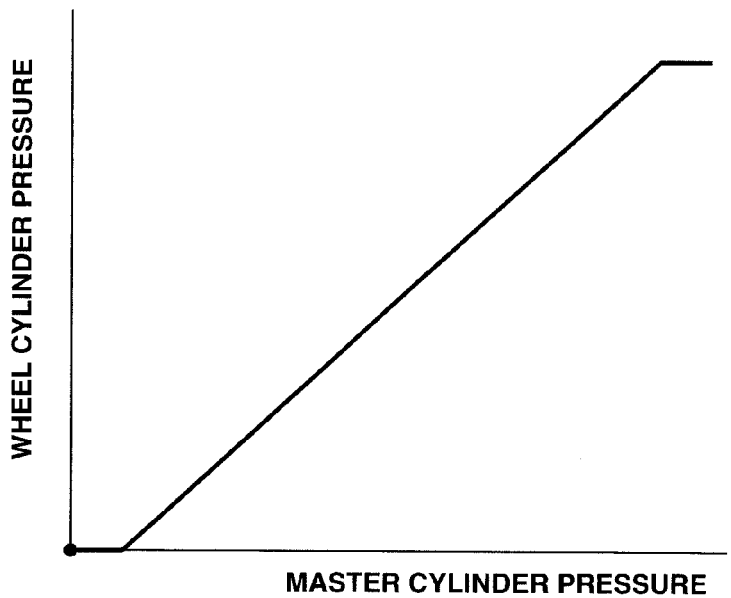
FIG. 3 is a boost map of the first embodiment.

A target pressure operating section 101 computes a target hydraulic pressure P* of the wheel cylinder W/C on the basis of the signal of a master cylinder pressure Pmc detected by the pressure sensor PMC, and outputs this target hydraulic pressure P* to an after mentioned pressure difference correcting section 102. More specifically, the wheel cylinder pressure according to the master cylinder pressure detected by the pressure sensor PMC is set in a boost map shown in FIG. 3, then on the basis of this boost map, the target pressure operating section 101 computes the target hydraulic pressure P*.

Here, the brake boost control apparatus of the first embodiment has no mechanical booster etc. (e.g. the booster using the engine negative pressure) between the master cylinder M/C and the hydraulic unit 31. Thus, the detected value by the pressure sensor PMC is the master cylinder pressure Pmc according to a depression force of the brake pedal BP by a driver. In other words, the pressure sensor PMC detects the master cylinder pressure Pmc according to the driver's brake pedal depression force.

In a case of well-known vehicles, the booster is installed between the brake pedal and the master cylinder. This booster is set so that the brake pedal depression force of the driver is boosted and the input rod is pressed then a high master cylinder pressure Pmc is produced. On the other hand, in the first embodiment, the master cylinder pressure Pmc according to the brake pedal depression force of the driver is produced. This point is different from the case of well-known vehicles. In this embodiment, regarding the target hydraulic pressure P*, a hydraulic pressure that would be produced in the master cylinder in the case where the booster is installed is set as the target hydraulic pressure. However, the target hydraulic pressure could be set appropriately, and is not especially limited.

The pressure difference correcting section 102 corrects the target hydraulic pressure P* on the basis of an after mentioned pressure difference correction value, and outputs this corrected target hydraulic pressure P*_h to an actuator control mode changing section 112. In the following description, the pressure difference correction value will be explained. The value detected by the stroke sensor SS indicates how much amount of the brake fluid in the master cylinder M/C is pushed out and flows out of the master cylinder M/C. In other words, the value detected by the stroke sensor SS indicates an amount of the fluid that is supplied from the master cylinder M/C to the wheel cylinder sides.

Thus, a fluid amount changing section 201 converts the value detected by the stroke sensor SS to the fluid amount. Then a fluid amount-hydraulic pressure converting section 202 converts the calculated fluid amount to the wheel cylinder pressure, and outputs a wheel cylinder pressure estimated value based on a hydraulic pressure rigidity.

Figure 4:
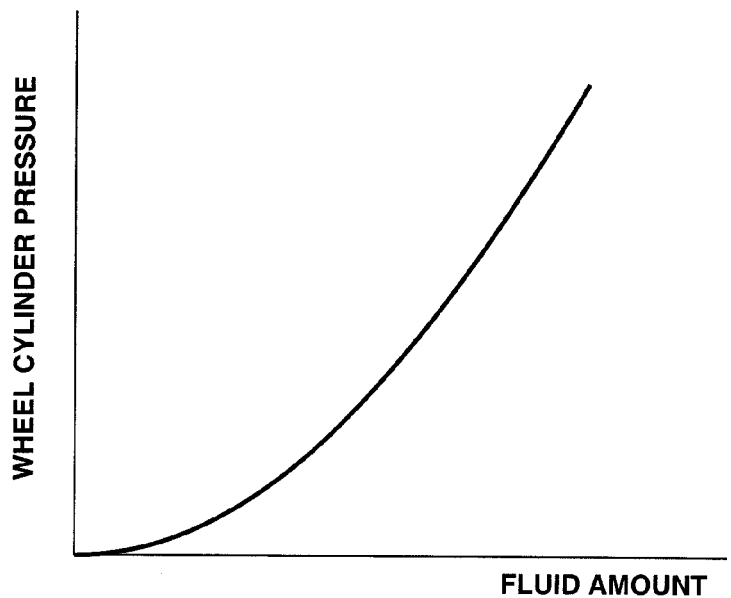
FIG. 4 is a hydraulic pressure rigidity map of the first embodiment.

FIG. 4 is a hydraulic pressure rigidity map. This fluid amount-hydraulic pressure conversion is called the hydraulic pressure rigidity, and the hydraulic pressure is estimated by a pipe rigidity of the hydraulic unit 31 and a rigidity of the wheel cylinder W/C. Although a relationship between the stroke amount of the brake pedal BP and the wheel cylinder pressure is slightly changed by a working or operating state of the pump P, its accuracy is basically very high.

In order to perform the fluid amount-hydraulic pressure conversion accurately, there is a need to correct the change based on the operating or driving state of the pump P etc. Therefore, a drive-command-based wheel cylinder pressure estimate operating section 205 computes a wheel cylinder pressure estimated value based on the drive command in accordance with the motor drive command and the drive commands of the gate-out valve 3 and the gate-in valve 2.

That is to say, when the pump P is working, the brake fluid is sucked in the pipe 11 and the pipe 12, and this suction amount is determined by the drive command of the pump P and drive command of the gate-in valve 2 and so on. On the other hand, when the pump operation stops, the brake fluid is not sucked in the pipe 11 and the pipe 12, all the brake fluid that flows out of the master cylinder M/C is then supplied to the wheel cylinder sides.

As described above, a difference (hereinafter, described as a wheel cylinder pressure estimated difference value) between the wheel cylinder pressure estimated value based on the hydraulic pressure rigidity and the wheel cylinder pressure estimated value based on the drive command is calculated by a wheel cylinder pressure estimated value correcting section 203. A gain multiplication section 204 multiplies the wheel cylinder pressure estimated difference value by a predetermined gain $K_{DWP}$, and outputs the pressure difference correction value to the pressure difference correcting section 102.

More specifically, when the wheel cylinder pressure estimated value based on the drive command is higher than the wheel cylinder pressure estimated value based on the hydraulic pressure rigidity, the correction is performed so that the target hydraulic pressure P* becomes small. On the other hand, when the wheel cylinder pressure estimated value based on the drive command is lower than the wheel cylinder pressure estimated value based on the hydraulic pressure rigidity, the correction is performed so that the target hydraulic pressure P* becomes large.

The actuator control mode changing section 112 selects any one of the following modes; a pressure increase control mode (or a compression control mode), a pressure decrease control mode (or a decompression control mode), and a hold control mode, as a control mode. Details of the each mode will be described later. In the following, with regard to the selection of the control mode in the first embodiment, two factors of the control mode selection or judge will be explained.

First Control Mode Judge Factor

A master cylinder pressure change quantity operating section 301 calculates a master cylinder pressure change quantity by differentiating the master cylinder pressure. A stroke change quantity operating section 302 calculates a stroke change quantity by differentiating the brake pedal stroke amount.

Figure 5:
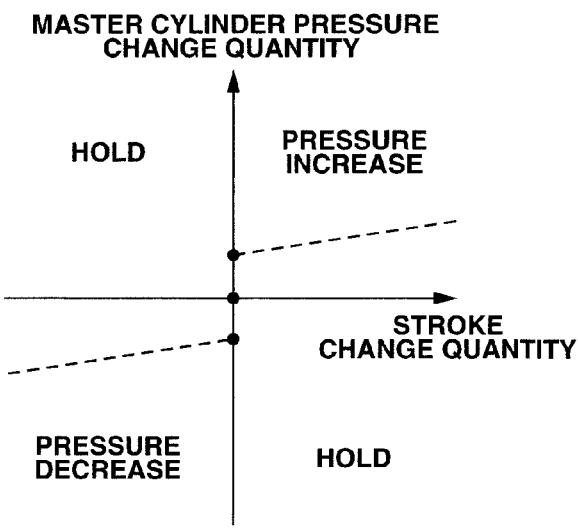
FIG. 5 is a pressure increase (compression)/hold/pressure decrease (decompression) control judge map of the first embodiment.

A control mode judge map 303 selects the mode of the pressure increase/the hold/the pressure decrease on the basis of the calculated master cylinder pressure change quantity and brake pedal stroke change quantity. FIG. 5 is a control mode judge map. Here, if the wheel cylinder pressure is controlled by a slight change of the stroke amount and the master cylinder pressure, there is a possibility that a control hunting will occur. Therefore, only in a case where the master cylinder pressure is changed by a predetermined amount or more with the brake stroke change, the control mode is changed. And in other cases except this case, the control mode judge map 303 selects the hold control.

More specifically, in a case where the driver depresses the brake pedal and the master cylinder pressure increases by the predetermined amount or more by the brake pedal depression, a judgment is made that there is a pressure increase intention (an intention of increasing the pressure), and the pressure increase control mode is selected. On the other hand, in a case where the driver returns the brake pedal and the master cylinder pressure decreases by the predetermined amount or more by the brake pedal return, a judgment is made that there is a pressure decrease intention (an intention of decreasing the pressure), and the pressure decrease control mode is selected. And in other cases except these cases, the hold control mode is selected. With this selection, the control hunting can be prevented, and a stable boost control can be achieved.

Second Control Mode Judge Factor (for Correction)

An F-S characteristic operating section 401 calculates how far a relationship between current brake pedal operating state and master cylinder pressure differs or is separated from an ideal characteristic on the basis of the master cylinder pressure and the stroke amount.

Figure 6:
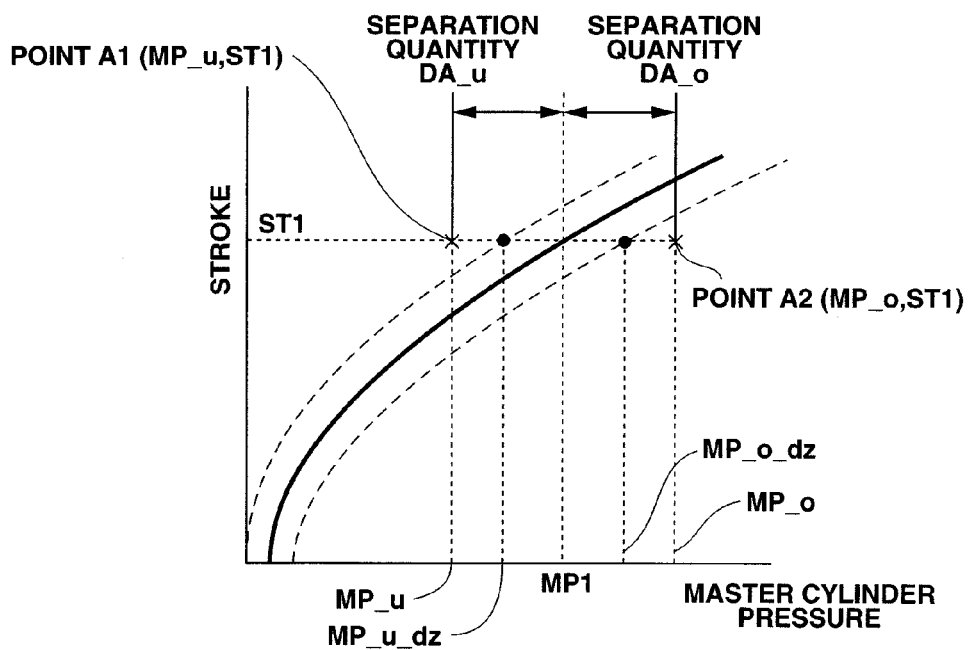
FIG. 6 is an F-S characteristic map of the first embodiment.

FIG. 6 is a drawing that indicates the relationship of the F-S characteristic. In FIG. 6, a thick solid line is the ideal F-S characteristic. This ideal F-S characteristic is a characteristic that indicates that when the driver depresses the brake pedal and the input rod shifts, how much the master cylinder pressure (i.e. a brake pedal reaction force) is produced.

In the first embodiment, besides controlling a boost ratio that is the relationship between the master cylinder pressure and the wheel cylinder pressure, the relationship between the master cylinder pressure and the brake pedal stroke amount is also controlled to maintain a predetermined relation, and thereby avoiding an awkward feeling which the driver feels or suffers. Hence, when the relationship between the master cylinder pressure and the brake pedal stroke amount differs or is separated from the ideal relation, the control mode is selected in accordance with its separation quantity. In the first embodiment, a dead band is set for this ideal F-S characteristic. Then when an actual F-S characteristic differs or is separated from the ideal F-S characteristic by this dead band or more, the correction is performed in accordance with this separation state.

A correction-purpose control mode judging section 402 judges a correction-purpose control mode on the basis of the stroke change quantity and information of the separation of the F-S characteristic. Here, the stroke change quantity is expressed as $\Delta ST$, an ideal master cylinder pressure when the stroke amount is ST1 is expressed as MP1, a separation lower limit master cylinder pressure when the stroke amount is ST1 is expressed as MP_u_dz, a separation upper limit master cylinder pressure when the stroke amount is ST1 is expressed as MP_o_dz, and the master cylinder pressure sensor value is expressed as MP.

(i) Case of $\Delta ST>0$ and MP<MP_u_dz In this case, "a forced (or compulsory) hold mode" is 10 judged. That is, in the case where the driver depresses the brake pedal, when the master cylinder pressure MP is lower than the separation lower limit master cylinder pressure MP_u_dz, there is a need to increase the master cylinder pressure. Thus, by the forced hold mode, the outflow of the brake fluid in the master cylinder M/C is suppressed. Then, since the driver has depressed the brake pedal, the master cylinder pressure gradually increases and approaches closer to the ideal value MP1.

(ii) Case of $\Delta ST<0$ and MP<MP_u_dz In this case, "a forced (or compulsory) pressure decrease mode" is judged. That is, in the case where the drive returns the brake pedal, when the master cylinder pressure MP is lower than the separation lower limit master cylinder pressure MP_u_dz, there is a need to increase the master cylinder pressure. In other words, there is a need to suppress a reduction amount of the master cylinder pressure against a returning amount of the brake pedal. Thus, by the forced pressure decrease mode, the gate-out valve 3 is opened, and an inflow of the brake fluid from the wheel cylinder sides to the master cylinder M/C is forced or accelerated. With this operation, the master cylinder pressure increases and approaches closer to the ideal value MP1.

(iii) Case of $\Delta ST>0$ and MP_o_dz<MP In this case, "a forced (or compulsory) pressure increase mode" is judged. That is, in the case where the driver depresses the brake pedal, when the master cylinder pressure MP is higher than the separation upper limit master cylinder pressure MP_o_dz, there is a need to decrease the master cylinder pressure. A way to decrease the master cylinder pressure when the brake pedal is depressed, is to draw the more brake fluid in the master cylinder M/C by the pump P and supply it to the wheel cylinder sides. Thus, by the forced pressure increase mode, the brake fluid in the master cylinder M/C is drawn, and a reduction of the brake fluid in the master cylinder M/C is forced or accelerated. With this operation, a gradient of the increase of the master cylinder pressure against the stroke increase is lowered, and the master cylinder pressure approaches closer to the ideal value MP1.

(iv) Case of $\Delta ST<0$ and MP_o_dz<MP In this case, "a forced (or compulsory) hold mode" is judged. That is, in the case where the drive returns the brake pedal, when the master cylinder pressure MP is higher than the separation upper limit master cylinder pressure MP_o_dz, there is a need to decrease the master cylinder pressure. A way to decrease the master cylinder pressure when the brake pedal is returned, is to reduce the brake fluid flowing into the master cylinder side. Thus, by the forced hold mode, the brake fluid flowing into the master cylinder M/C is shut off. With this operation, a gradient of the decrease of the master cylinder pressure against the stroke decrease becomes large, and the master cylinder pressure approaches closer to the ideal value MP1.

(v) Case of MP_u_dz<MP <MP_o_dz In this case, "a control mode judge map priority mode" is judged. That is, when the F-S characteristic is positioned in the dead band, a control required to correct the F-S characteristic is not especially needed, and the control mode that is selected or judged by the control mode judge map 303 is selected in preference to the F-S characteristic correction control.

[Correction Control Process Based on Separation Quantity]

When the information of the separation of the F-S characteristic (for instance, separation quantities DA_u and DA_o in FIG. 6) is calculated in the F-S characteristic operating section 401, this separation information is output to a gate-out valve drive command correction quantity operating section 404 and a motor drive command correction quantity operating section 405 through a information providing section 403.

The gate-out valve drive command correction quantity operating section 404 outputs a correction control quantity based on the separation information for the gate-out valve control in a pressure decrease control mode 114. As described above, when the forced pressure decrease mode is selected, there is a need to open the gate-out valve 3. Thus, in a case where the separation is large, a correction control quantity by which an opening degree of the gate-out valve 3 becomes large is output. With this control, the state in which the master cylinder pressure is low against the stroke amount can approach closer to the ideal state.

The motor drive command correction quantity operating section 405 outputs a correction control quantity based on the separation information for a motor speed control in a pressure increase control mode 113. As described above, when the forced pressure increase mode is selected, there is a need to draw the brake fluid in the master cylinder M/C positively or aggressively to the wheel cylinder sides. Thus, in a case where the separation is large, a correction control quantity by which a motor drive amount becomes large is output. With this control, the state in which the master cylinder pressure is high against the stroke amount can approach closer to the ideal state.

[Control Mode Judge Process]

A control mode determining section 304 selects a final control mode on the basis of the control mode selected by the control mode judge map 303 and the control mode selected by the correction-purpose control mode judging section 402, and outputs the final control mode to the actuator control mode changing section 112. Here, with regard to the order of priority of the control mode, the control mode selected by the control mode judge map 303 has low priority, and the control mode selected by the correction-purpose control mode judging section 402 has high priority.

Put another way, only in the case where the control mode judge map priority mode is selected in the correction-purpose control mode judging section 402, the control mode selected by the control mode judge map 303 is selected. In other cases except this case, the control mode that is judged in the correction-purpose control mode judging section 402 is selected.

That is to say, even if the control mode based on the driver's intention is selected in accordance with the relationship between the brake pedal stroke change quantity by the driver's operation and the master cylinder pressure change quantity, in order to bring the F-S characteristic closer to the ideal characteristic, there is a need to forcibly change the control mode. In this way, by setting the order of priority of the selected or judged control mode, the ideal F-S characteristic can be obtained.

When the control mode is changed by the actuator control mode changing section 112, any one of the following controls; the pressure increase control, the pressure decrease control, and the hold control, is executed. In the following, the each control mode will be explained.

[Pressure Increase Control Mode]

When the pressure increase control mode 113 is selected, the motor speed control and the gate-out valve control (a balance control) are carried out. At this time, regarding a gate-in valve control as well, a linear valve open control is executed. Here, the linear valve open control is a control in which the gate-in valve 2 is not opened instantaneously, but is gradually opened. With this linear valve open control, a rapid change of the hydraulic pressure can be suppressed. Details of the gate-out valve control and the motor speed control will be described later.

[Pressure Decrease Control Mode]

When the pressure decrease control mode 114 is selected, the gate-out valve control (the balance control) is carried out. At this time, the motor speed control is stopped, and also the gate-in valve control is stopped.

[Hold Control Model]

When a hold control mode 115 is selected, the motor speed control and the gate-in valve control (a balance control) are stopped, and a linear valve close control of the gate-out valve 3 is executed. Here, the linear valve close control is a control in which the gate-out valve 3 is not closed instantaneously, but is gradually closed. With this linear valve close control, a rapid change of the hydraulic pressure can be suppressed.

[Gate-Out Valve Control]

Figure 7:
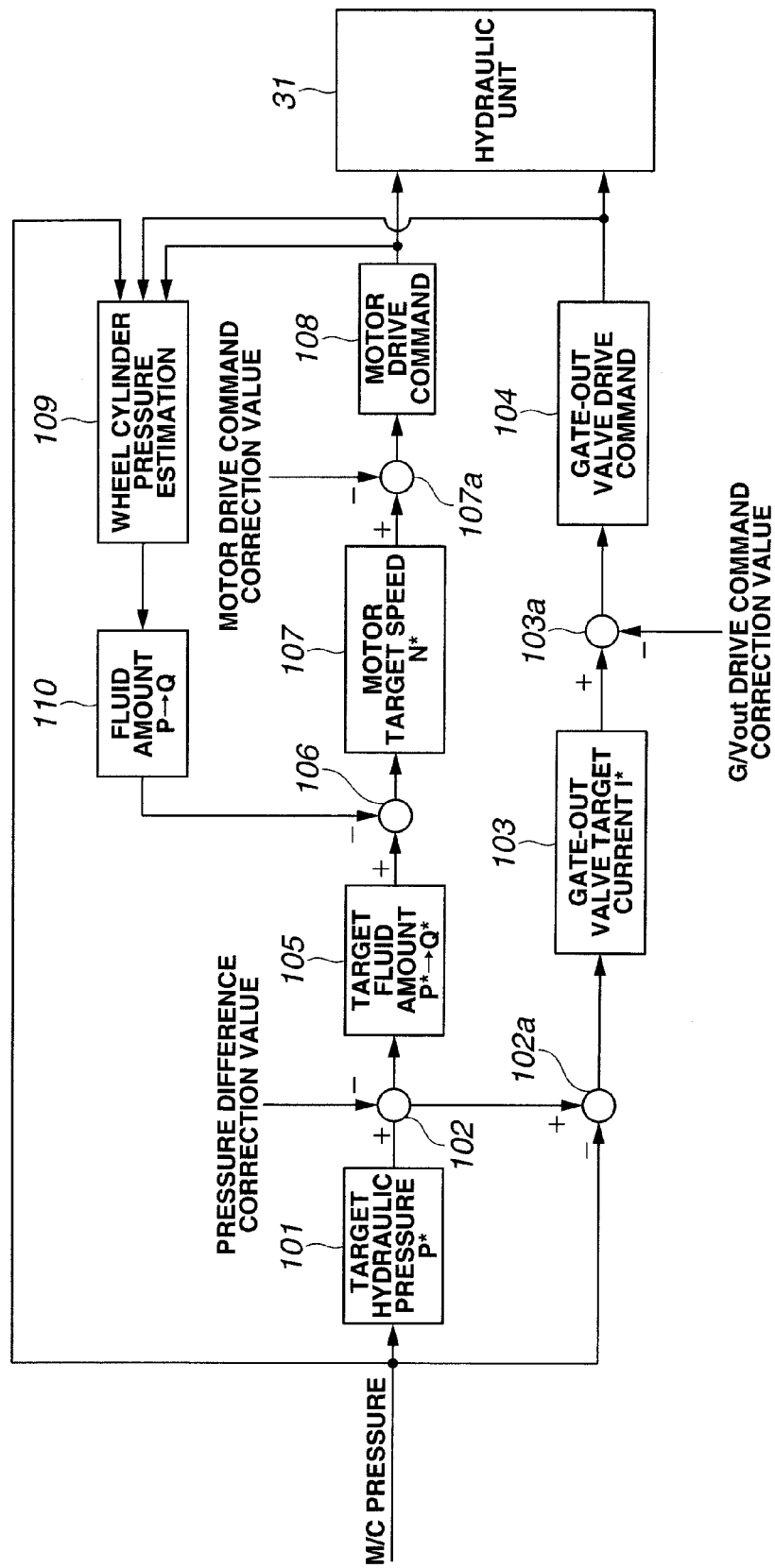
FIG. 7 is a block diagram showing a configuration of a pressure increase control in the controller of the brake boost control apparatus of the first embodiment.

Next, the gate-out valve control in the pressure increase control mode and the pressure decrease control mode will be explained. FIG. 7 is a control block diagram showing a configuration of control in the pressure increase control mode. Here, the same configuration as the configuration of FIG. 2 is denoted by the same reference sign.

A pressure difference operating section 102a computes a target pressure difference $\Delta P^*$ that is a pressure difference between the corrected target hydraulic pressure $P^*\_h$ and the master cylinder pressure sensor value, and outputs it to a gate-out valve target current operating section 103.

Figure 8:
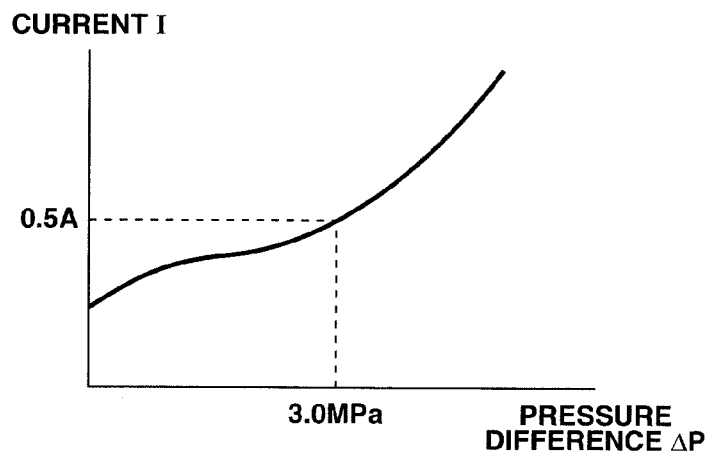
FIG. 8 is a gate-out valve current-differential pressure characteristic map of the first embodiment.

The gate-out valve target current operating section 103 computes a target current value $I^*$ of the gate-out valve 3. More specifically, as shown in a gate-out valve current-differential pressure (pressure difference) characteristic map in FIG. 8, the gate-out valve target current operating section 103 computes the target current value $I^*$ of the gate-out valve 3 on the basis of an input pressure difference $\Delta P$. For example, to secure the target pressure difference $\Delta P^*$ of 3.0 Mpa, current of 0.5 A is set as the target current value $I^*$. This characteristic is values that are fixed by design value of the electromagnetic valve.

A gate-out valve target current correcting section 103a corrects the gate-out valve target current value by the correction control quantity calculated by the gate-out valve drive command correction quantity operating section 404, and output it to a gate-out valve drive commanding section 104.

The gate-out valve drive commanding section 104 controls a switching circuit etc. (not shown) by a PWM drive so that the current of the gate-out valve 3 becomes the target current value $I^*$, then outputs the desired current value to the gate-out valve 3.

Figure 9:
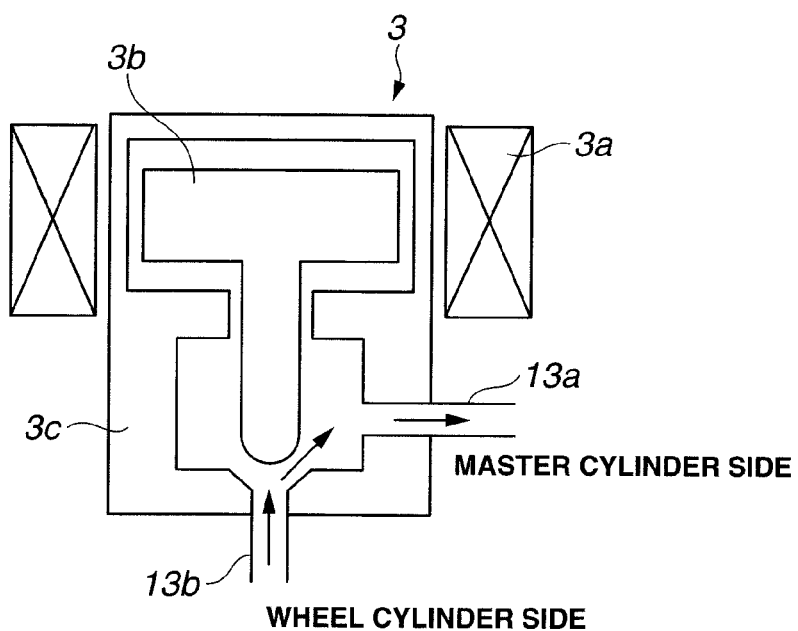
FIG. 9 is a schematic view showing a structure of the gate-out valve.

Here, a differential pressure (pressure difference) control of the gate-out valve 3 will be explained. FIG. 9 is a schematic view illustrating a structure of the gate-out valve 3. As can be seen in FIG. 9, the gate-out valve 3 has a coil 3a that generates an electromagnetic attraction, a movable element 3b that operates or moves by this electromagnetic attraction, and a valve body 3c in which the pipes 13a and 13b communicates with each other.

When the movable element 3b moves downward in FIG. 9, the pipes 13a and 13b become a valve close state (namely that the pipes 13a and 13b do not communicate with each other). On the other hand, when the movable element 3b moves upward in FIG. 9, the pipes 13a and 13b become a valve open state (namely that the pipes 13a and 13b communicate with each other). That is to say, a communication state (differential pressure or pressure difference) of the pipes 13a and 13b is determined according to an up-and-down direction position of the movable element 3b.

The movable element 3b receives forces in the valve body 3c. More specifically, a force Fwc that pushes up the movable element 3b in an upward direction in FIG. 9 in accordance with a pressure Pwc of the wheel cylinder sides, a force Fmc that pushes down the movable element 3b in a downward direction in FIG. 9 in accordance with the master cylinder pressure Pmc, and a force Fb that pushes down the movable element 3b in the downward direction in FIG. 9 in accordance with the electromagnetic attraction, act on the movable element 3b. Here, since the gate-out valve 3 is the normally-open valve, in fact, a force in a valve open direction acts on the movable element 3b by a spring. However, this force is disregarded here now. (When taking account of this force by the spring, offset value etc. are given.)

The movable element 3b stops in a position where a balance of these forces is struck. In other words, in a case of Fmc+Fb−Fwc=0, the movable element 3b stops. In a case of Fmc+Fb−Fwc>0, the movable element 3b moves downward. In a case of Fmc+Fb−Fwc<0, the movable element 3b moves upward. Fmc is a value that is correlated with the master cylinder pressure Pmc, and Fwc is a value that is correlated with the wheel cylinder pressure. Therefore, it can be said that the target pressure difference ΔP* is correlated with (Fmc−Fwc). From the above relationship, since the position of the movable element 3b is determined by a relation of magnitude between (Fmc−Fwc) and Fb, if the same electromagnetic attraction Fb as the target pressure difference ΔP* is set, a position of the movable element 3b where the target pressure difference ΔP* can be secured is automatically determined.

Now, in the brake boost control apparatus, in a case where a high pressure is produced at a side from the gate-out valve 3 to wheel cylinder by using pump etc. and then a state in which the wheel cylinder pressure Pwc is higher than the master cylinder pressure Pmc is produced, when setting the electromagnetic attraction Fb to a value corresponding to a desired pressure difference ΔP, the position of the movable element 3b is automatically changed according to a pressure increase action or working performed at the wheel cylinder sides, and the target wheel cylinder pressure can be obtained. For instance, when a discharge pressure of the pump is high, until the movable element 3b moves upward and the pressure difference automatically becomes the target pressure difference ΔP*, the wheel cylinder pressure is discharged to the master cylinder side, then this works in a pressure decreasing direction.

With this working, a sophisticated feedback control is not required, and control error of the motor can be absorbed or accommodated by the gate-out valve 3. In other words, after providing the target current value I* that corresponds to the target pressure difference ΔP* to the gate-out valve 3 as a feed-forward control on the basis of the driver's depression force, the working of the gate-out valve 3 is equivalent to a mechanical feedback mechanism that attains the target pressure difference ΔP*. Thus, as compared with an electronic feedback control mechanism, there is no need to provide a sensor for detecting a state of a controlled object, and a control stability becomes remarkably high.

[Motor Drive Control]

A target fluid amount operating section 105 converts the corrected target hydraulic pressure P*_h output from the pressure difference correcting section 102 to a target fluid amount Q*. The target fluid amount Q* is an amount that is based on a relationship in which when a certain fluid amount Q flows to the wheel cylinder W/C, a certain hydraulic pressure P is produced. This amount is determined by a design value of the wheel cylinder.

A fluid amount deviation operating section 106 computes a fluid amount deviation or difference ΔQ between the target fluid amount Q* and an actual fluid amount Q that is input from an after mentioned fluid amount converting section 110, and outputs it to an after mentioned motor target speed operating section 107

The motor target speed operating section 107 divides the input fluid amount deviation ΔQ by a control cycle period (this corresponds to differentiation) and converts it to a flow amount, and on the basis this flow amount, the motor target speed operating section 107 computes a target speed N* of the motor M. That is, since the motor speed is correlated with a flow per unit time of the fluid discharged from the pump P, the motor target speed N* required to compensate for a needed fluid amount deviation is computed on the basis of the differentiation value of the fluid amount.

A motor target speed correcting section 107a corrects the motor target speed on the basis of the correction control quantity computed by the motor drive command correction quantity operating section 405, and outputs it to a motor drive commanding section 108.

The motor drive commanding section 108 computes a motor drive command value to attain the motor target speed N*, and outputs the drive command for the motor M. Here, in the first embodiment, the motor is not especially limited. However, for example, when using a brush motor, a counter-electromotive force generated by an on-off control of the brush motor is detected, and since this counter-electromotive force and the motor speed have a proportional relationship, the motor speed is estimated by the proportional relationship, then the control is carried out so that this estimated motor speed becomes the motor target speed N*. Or when using a brushless motor, since a revolution speed sensor is provided, the control could be carried out so that the motor speed becomes the motor target speed N* on the basis of a detected value by the revolution speed sensor.

A wheel cylinder pressure estimating section 109 estimates the wheel cylinder pressure on the basis of the master cylinder pressure Pmc, the gate-out valve drive command value and the motor drive command value. More specifically, the estimation is performed by the following steps.

(i) The pump discharge amount [m³/s] is calculated from the motor speed. Then a pump discharge fluid amount [m³] is calculated by performing a multiplication of the control cycle period and the pump discharge amount.

(ii) A relationship between the wheel cylinder pressure and a wheel cylinder fluid amount is previously stored, and by using this relationship, the wheel cylinder fluid amount is converted from the last estimated wheel cylinder pressure. And further, the pump discharge fluid amount calculated at step (i) is added to the wheel cylinder fluid amount. Then this amount is converted to the wheel cylinder pressure again.

(iii) An upper limit of the wheel cylinder pressure is fixed from the target pressure difference determined by the master cylinder pressure Pmc and the gate-out valve drive command value. And this limit operation is performed to the calculated wheel cylinder pressure at step (ii), then this wheel cylinder pressure is set as a final estimated wheel cylinder pressure.

Here, this wheel cylinder pressure estimating section 109 could be the drive-command-based wheel cylinder pressure estimate operating section 205 shown in FIG. 2, and is not especially limited.

The fluid amount converting section 110 converts the estimated wheel cylinder pressure to the fluid amount Q that is actually supplied to the wheel cylinder W/C, and outputs it to the fluid amount deviation operating section 106. That is, in the case of the motor drive control, in order to avoid a needless motor drive and to secure a brake pedal feeling, the electronic feedback control is carried out on the basis of the target fluid amount Q* and the actual fluid amount Q.

In the above description, although the gate-out valve control in the pressure increase control mode has been explained, the gate-out valve control in the pressure decrease control mode is also executed by the same control logic except that the motor is stopped, thus its explanation is omitted here. As for the hold control mode, since the both of the gate-out valve control and the motor speed control are stopped and only the linear valve close control of the gate-out valve 3 is executed, its explanation is omitted here.

Figure 10:
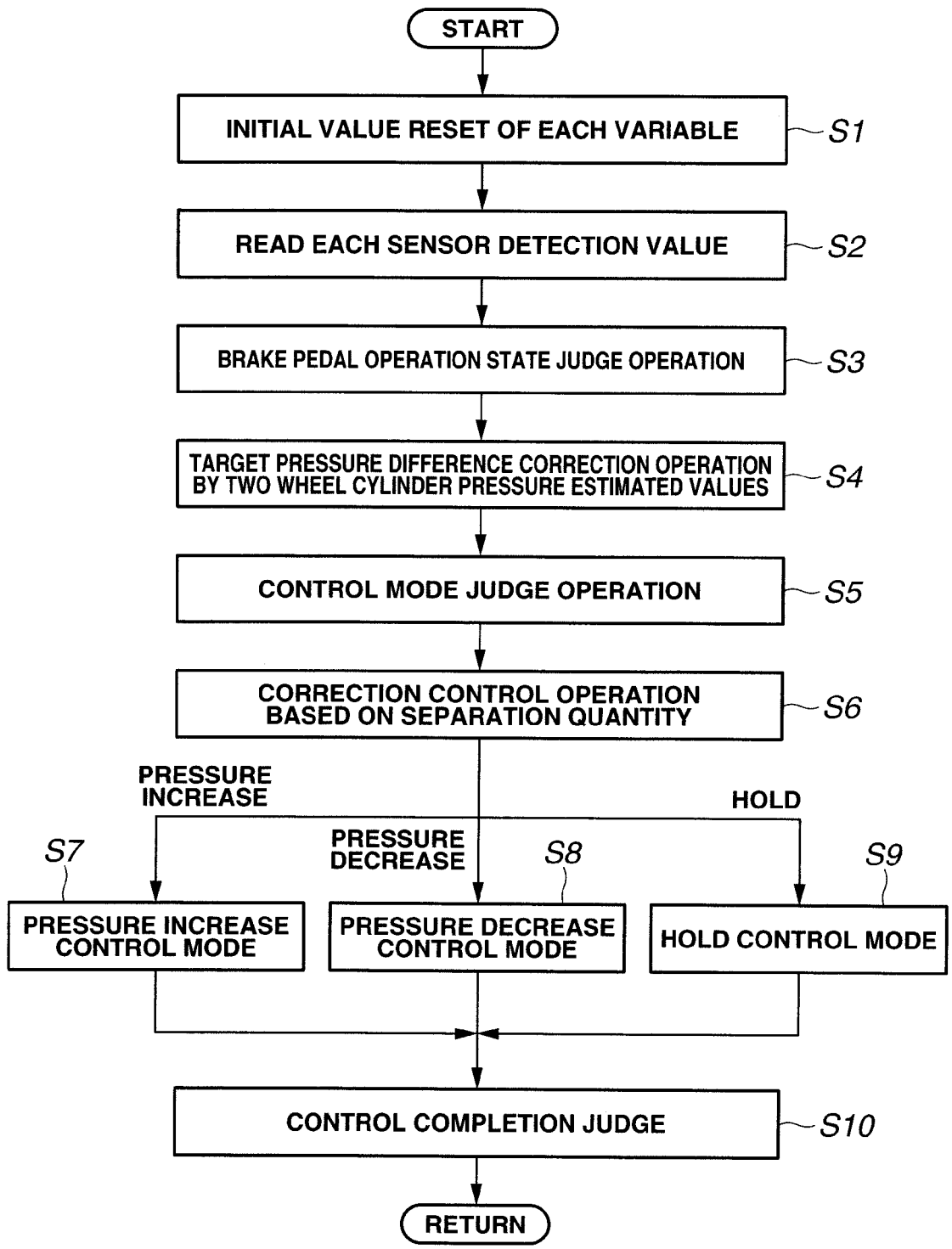
FIG. 10 is a flow chart for a boost control of the first embodiment.

In FIG. 10, a flow chart for the boost control is shown.

At step S1, initial values of each variable are set. Here, the each variable indicates flags, timer values, and operation or calculation factors and so on which are used in the control.

At step S2, the detected values of the each sensor are read.
At step S3, the presence or absence of the driver's brake pedal operation is detected from a signal of the brake switch BS.
At step S4, the target hydraulic pressure P* is corrected on the basis of the pressure difference of the two different wheel cylinder pressure estimated values. Here, the two different wheel cylinder pressure estimated values are the wheel cylinder pressure estimated value based on the hydraulic pressure rigidity that is estimated by the value of the stroke sensor SS and the wheel cylinder pressure estimated value based on the drive command.
At step S5, on the basis of the detected value of the stroke sensor SS, the detected master cylinder pressure Pmc, the stroke change quantity and the master cylinder pressure change quantity, a judgment is made whether or not the any one of the following control mode; the pressure increase/the hold/the pressure decrease, is executed.
At step S6, the correction control quantity is computed on the basis of the separation quantity between the actual F-S characteristic and the ideal F-S characteristic. Then the operated motor drive command correction quantity is output to the pressure increase control mode 113, and the gate-out valve drive command correction quantity is output to the pressure decrease control mode 114.
At step S7, the pressure increase control mode is executed.
At step S8, the pressure decrease control mode is executed.
At step S9, the hold control mode is executed.
At step S10, a judgment is made that the boost control is completed. If the boost control is judged to be completed, the each control mode is ended, and the gate-out valve 3 is fully opened, and the gate-in valve 2 is fully closed, then the motor drive is stopped.

Figure 11:
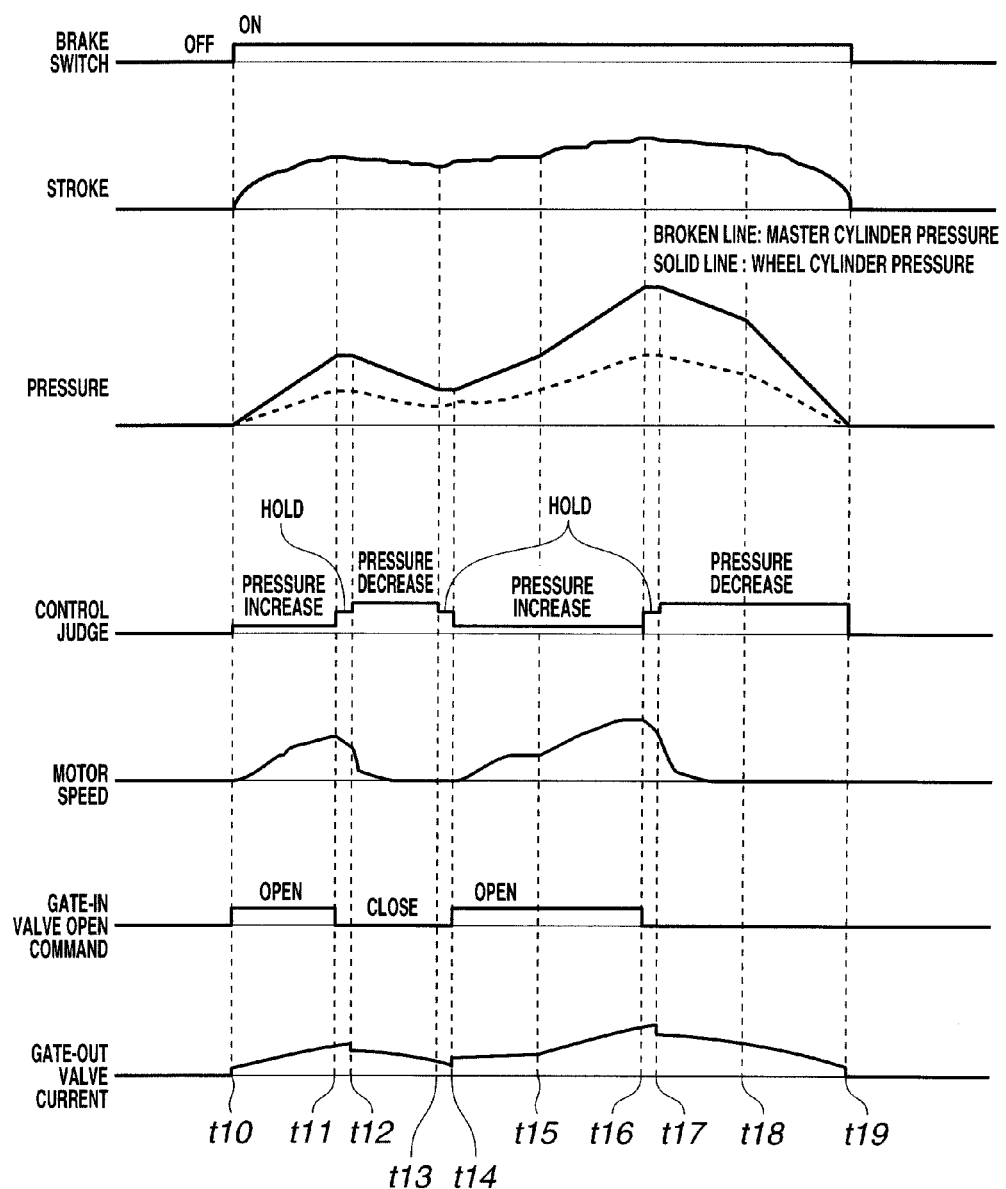
FIG. 11 is a time chart for the boost control of the first embodiment.

Next, the operation of the boost control based on the above control flow will be explained. FIG. 11 is a time chart when executing the boost control.

When the driver operates the brake pedal at time t10, ON of the brake switch BS is judged by the driver's brake pedal operation judge at step S3, and the boost control is started. At the same time, at step S4, the target hydraulic pressure P* is appropriately corrected in accordance with the wheel cylinder pressure estimated value based on the hydraulic pressure rigidity and the wheel cylinder pressure estimated value based on the drive command. Further, at step S5, from the relationship between the master cylinder pressure change quantity and the stroke change quantity, the pressure increase control is selected.

When the pressure increase control is selected, the pressure increase control mode is carried out at step S7. Firstly, the target motor speed N* is determined from the master cylinder pressure Pmc and the corrected target hydraulic pressure P*_h of the target wheel cylinder pressure, and the motor drive command is output. Secondly, the gate-in valve 2 is brought in the open state. Then lastly, the gate-out valve current I* is computed from the master cylinder pressure Pmc and the corrected target hydraulic pressure P*_h, and a duty ratio is output.

When the master cylinder pressure change quantity and the stroke change quantity lower at time t11, the hold control is selected at step S5. When the hold control is selected, the motor M is stopped at step S9. Next, the gate-in valve 2 is brought in the closed state. Further, the gate-out valve current I* is computed from the master cylinder pressure Pmc and the corrected target hydraulic pressure P*_h, and the duty ratio is output. Since the wheel cylinder fluid amount is not changed during the hold control, the last wheel cylinder pressure remains unchanged and is set as it is. Here, since the hold control is the control in which the hydraulic pressure in the wheel cylinder W/C does not change, a control that sets the gate-out valve current I* to a relatively higher fixed value and ensures the closing of the gate-out valve 3, may be carried out.

When the brake pedal is returned and the master cylinder pressure change quantity and the stroke change quantity are changed in a negative direction at time t12, the pressure decrease control is selected at step S5. When the pressure decrease control is selected, the motor M is stopped at step S8. Next, the gate-in valve 2 is brought in the closed state. Further, the gate-out valve current I* is computed from the master cylinder pressure Pmc and the corrected target hydraulic pressure P*_h, and the duty ratio is output. With regard to the control mode from time t13 to t19, since the same control is executed, its explanation is omitted here.

During the above control, when the F-S characteristic differs or is separated from the ideal characteristic, instead of the control mode judged from the relationship between the master cylinder pressure change quantity and the stroke change quantity, the control mode is changed to the control mode in which the F-S characteristic approaches closer to the ideal characteristic. For example, a case where the actual F-S characteristic is positioned on a point A1 (MP_u, ST1) in FIG. 6 will be explained. The actual F-S characteristic can be positioned on the point A1 in all modes of the pressure increase control mode, the hold control mode and the pressure decrease control mode.

In the case where the actual F-S characteristic is positioned on the point A1 in the pressure increase control mode, since the stroke change quantity ΔST is plus (a plus quantity), the mode is changed to the forced hold mode. Then, since the driver has depressed the brake pedal, the wheel cylinder pressure gradually increases, and while a stroke amount of the point A1 in FIG. 6 is being kept at about ST1, the point A1 shifts in a right direction and approaches closer to the ideal value MP1. In the case of the forced hold mode, the correction based on the separation quantity ΔDA_u is not carried out.

In the case where the actual F-S characteristic is positioned on the point A1 in the hold control mode, when the stroke change quantity ΔST is a small plus quantity (or a small positive value), since the mode is judged to be the forced hold mode, there is no change in the control mode. On the other hand, when the stroke change quantity ΔST is a small minus quantity (or a small negative value), the mode is changed to the forced pressure decrease mode. Then, on the basis of the separation quantity ΔDA_u, the correction is carried out so that a valve open amount of the gate-out valve 3 becomes large. And since the inflow of the brake fluid from the wheel cylinder sides to the master cylinder M/C is forced or accelerated, the master cylinder pressure increases, and while the stroke amount of the point A1 in FIG. 6 is being kept at about ST1, the point A1 shifts in the right direction and approaches closer to the ideal value MP1.

In the case where the actual F-S characteristic is positioned on the point A1 in the pressure decrease control mode, since the stroke change quantity ΔST is minus (a minus quantity), the mode is judged to be the forced pressure decrease mode, and consequently there is no change in the control mode. However, the correction based on the separation quantity ΔDA_u is carried out.

Next, a case where the actual F-S characteristic is positioned on a point A2 (MP_o, ST1) in FIG. 6 will be explained. The actual F-S characteristic can be positioned on the point A2 in all modes of the pressure increase control mode, the hold control mode and the pressure decrease control mode.

In the case where the actual F-S characteristic is positioned on the point A2 in the pressure increase control mode, since the stroke change quantity ΔST is plus (the plus quantity), the mode is judged to be the forced pressure increase mode, and consequently there is no change in the control mode. However, on the basis of the separation quantity ΔDA_o, the correction is carried out so that the motor drive amount becomes large. And since the brake fluid in the master cylinder M/C is drawn and the reduction of the brake fluid in the master cylinder M/C is forced or accelerated, the master cylinder pressure decreases, and while a stroke amount of the point A2 in FIG. 6 is being kept at about ST1, the point A2 shifts in a left direction and approaches closer to the ideal value MP1.

In the case where the actual F-S characteristic is positioned on the point A2 in the pressure decrease control mode, since the stroke change quantity ΔST is minus (the minus quantity), the mode is changed to the forced hold mode. Then, since the state in which the driver returns the brake pedal is maintained, the gradient of the decrease of the master cylinder pressure becomes large with the decrease of the stroke amount, and the point A2 shifts in the left direction while slightly moving downward and approaches closer to the ideal value MP1.

In the case where the actual F-S characteristic is positioned on the point A2 in the hold control mode, when the stroke change quantity ΔST is plus (the plus quantity), the mode is changed to the forced pressure increase mode. Then, on the basis of the separation quantity ΔDA_o, the correction is carried out so that the motor drive amount becomes large. And since the brake fluid in the master cylinder M/C is drawn to the wheel cylinder sides under the condition of almost no brake pedal operation by the driver, the master cylinder pressure decreases, and the point A2 shifts in the left direction while slightly moving upward and approaches closer to the ideal value MP1.

On the other hand, when the stroke change quantity ΔST is minus (the minus quantity), since the mode is judged to be the forced hold mode, there is no change in the control mode. Then, since the brake pedal stroke is changed in the decreasing direction, the point A2 shifts in the left direction while slightly moving downward and approaches closer to the ideal value MP1.

As explained above, in the brake boost control apparatus of the first embodiment, the following effects are obtained.

(1) A brake boost control apparatus has a brake operation member (the brake pedal BP and/or the input rod 1) by which the driver performs the braking operation; the master cylinder M/C which is connected with the brake operation member (the brake pedal BP and/or the input rod 1) and produces the pressure in the brake fluid; the wheel cylinder W/C which is installed at the each wheel and produces the braking force to the wheel by the brake fluid in the master cylinder M/C; the hydraulic pump P which draws the brake fluid from the master cylinder M/C and discharges the brake fluid to the wheel cylinder side; a master cylinder pressure detection section or means (the pressure sensor PMC) which is installed between the master cylinder M/C and the suction side of the hydraulic pump P and detects the pressure of the brake fluid which is produced by the operation of the brake operation member (the brake pedal BP and/or the input rod 1); a brake stroke amount detection section or means (the stroke sensor SS) that detects the stroke amount of the brake operation member (the brake pedal BP and/or the input rod 1); a hydraulic pressure control section or means (the gate-out valve 3, the pump P) that controls the pressure of the wheel cylinder (W/C) together with the hydraulic pump P; a boost section or means which boosts the pressure of the brake fluid which is produced by the master cylinder M/C by the hydraulic pump P and increases the wheel cylinder pressure; and the control unit CU that controls at least one of the hydraulic pump P and the hydraulic pressure control section (the gate-out valve 3, the pump P) so that the stroke amount detected by the brake stroke amount detection section (the stroke sensor SS) under the boost operation by the boost section and the pressure detected by the master cylinder pressure detection section (the pressure sensor PMC) are maintained at the predetermined relationship.

Therefore, the boost control can be achieved without providing the awkward feeling to the driver.

(2) The hydraulic pressure control section has an outside gate valve (the gate-out valve 3) which is installed between the master cylinder M/C and the suction side of the hydraulic pump P and controls the wheel cylinder pressure, and the control unit CU holds the wheel cylinder pressure when the detected pressure of the master cylinder pressure detection section (PMC) lowers during the pump operation, and decreases the wheel cylinder pressure by controlling the valve open amount of the outside gate valve (the gate-out valve 3) when the detected pressure (the master cylinder pressure) of the master cylinder pressure detection section (PMC) lowers more than the predetermined value after starting the hold of the wheel cylinder pressure.

Therefore, the boost control can be achieved while maintaining a balance of the brake fluid and preventing the control hunting. Likewise, the hydraulic pressure control section holds the wheel cylinder pressure when the detected pressure (the master cylinder pressure) of the master cylinder pressure detection section (PMC) rises during the pressure decreasing operation of the wheel cylinder pressure by controlling the valve open amount of the gate-out valve 3, and increases the wheel cylinder pressure by operating the hydraulic pump P when the detected pressure (the master cylinder pressure) of the master cylinder pressure detection section (PMC) rises more than the predetermined value after starting the hold of the wheel cylinder pressure.

Therefore, the boost control can be achieved while maintaining a balance of the brake fluid and preventing the control hunting.

(3) The hydraulic pressure control section has an outside gate valve (the gate-out valve 3) which is installed between the master cylinder M/C and the suction side of the hydraulic pump P and controls the wheel cylinder pressure, and the control unit CU corrects the control quantity of the hydraulic pump P on the basis of a first wheel cylinder pressure (the wheel cylinder pressure estimated value based on the hydraulic pressure rigidity) that is estimated from the stroke amount detected by the brake stroke amount detection section (the stroke sensor SS) and a second wheel cylinder pressure (the wheel cylinder pressure estimated value based on the drive command) that is estimated from the pump operating state and an outside gate valve (the gate-out valve) operating state. Therefore, it is possible to operate the hydraulic pump P accurately, and achieve a stable boost control.

(4) The hydraulic pressure control section has an outside gate valve (the gate-out valve 3) which is installed between the master cylinder M/C and the suction side of the hydraulic pump P and controls the wheel cylinder pressure, and the control unit CU corrects the control quantity of the valve open amount of the outside gate valve (the gate-out valve 3) on the basis of the wheel cylinder pressure estimated value based on the hydraulic pressure rigidity that is estimated from the stroke amount detected by the brake stroke amount detection section (the stroke sensor SS) and the wheel cylinder pressure estimated value based on the pump operating state and the drive command of the gate-out valve 3.

Therefore, the boost control can be achieved while maintaining the relationship between the master cylinder pressure and the stroke amount at the predetermined relationship.

(5) The control unit CU corrects the control quantity of the hydraulic pump P so that the relationship between the pressure detected by the master cylinder pressure detection section (the pressure sensor PMC), the stroke amount detected by the brake stroke amount detection section (the stroke sensor SS), and the wheel cylinder pressure calculated from the pump operating state, the gate-out valve operating state and the stroke amount is maintained at the predetermined relationship.

Therefore, the boost control can be achieved while maintaining the relationship between the master cylinder pressure and the stroke amount at the predetermined relationship.

(6) The control unit CU corrects the valve open amount of the gate-out valve 3 so that the relationship between the pressure detected by the master cylinder pressure detection section (the pressure sensor PMC), the stroke amount detected by the brake stroke amount detection section (the stroke sensor SS), and the wheel cylinder pressure calculated from the pump operating state, the gate-out valve operating state and the stroke amount is maintained at the predetermined relationship.

Therefore, the boost control can be achieved while maintaining the relationship between the master cylinder pressure and the stroke amount at the predetermined relationship.

(7) Although the configuration of the first embodiment has no boost mechanism 2, it is possible that the brake operation member (the brake pedal BP and/or the input rod 1) has the boost mechanism and the master cylinder M/C and the master cylinder M/C works through the boost mechanism then the pressure is produced in the brake fluid.

With this configuration, the double boost system or mechanism can be set.

(8) A brake boost control apparatus has a brake operation member (the brake pedal BP and/or the input rod 1) that works by the driver's braking operation; the master cylinder M/C which works by the brake operation member and produces the pressure in the brake fluid; the wheel cylinder W/C which is installed at each wheel and produces the braking force to the wheel; the hydraulic pump P which is used for the pressure increase control of the wheel cylinder W/C by drawing the brake fluid from the master cylinder M/C and discharging the brake fluid to the wheel cylinder side; a pressure detection section or means (the pressure sensor PMC) which is installed between the master cylinder M/C and the suction side of the hydraulic pump P and detects the pressure of the brake fluid which is produced by the brake operation member; a brake stroke amount detection section or means (the stroke sensor SS) which is installed between the brake operation member and the master cylinder M/C and detects the stroke amount of the brake operation member; a boost section or means which boosts the pressure of the brake fluid, produced by the brake operation member, by the hydraulic pump P and increases the wheel cylinder pressure; and the control unit CU that selectively changes controls of the wheel cylinder pressure of the pressure increase control/the hold control/the pressure decrease control on the basis of the stroke amount detected by the brake stroke amount detection section (the stroke sensor SS) under the boost operation by the boost section and the pressure of the brake fluid detected by the pressure detection section (the pressure sensor PMC).

Therefore, the boost control can be achieved while preventing the control hunting without providing the awkward feeling to the driver.

(9) The brake boost control apparatus further has the gate-out valve 3 which is installed between the master cylinder M/C and the suction side of the hydraulic pump P and controls the wheel cylinder pressure, and the control unit CU holds the wheel cylinder pressure when the detected pressure of the pressure detection section (the pressure sensor PMC) lowers during the pressure increase control, and controls the wheel cylinder pressure by controlling the valve open amount of the gate-out valve 3 when the detected pressure of the pressure detection section (the pressure sensor PMC) lowers more than the predetermined value after starting the hold of the wheel cylinder pressure.

Therefore, the boost control can be achieved while maintaining a balance of the brake fluid and preventing the control hunting. Likewise, the hydraulic pressure control section holds the wheel cylinder pressure when the detected pressure (the master cylinder pressure) of the master cylinder pressure detection section (PMC) rises during the pressure decreasing operation of the wheel cylinder pressure by controlling the valve open amount of the gate-out valve 3, and increases the wheel cylinder pressure by operating the hydraulic pump P when the detected pressure (the master cylinder pressure) of the master cylinder pressure detection section (PMC) rises more than the predetermined value after starting the hold of the wheel cylinder pressure.

Therefore, the boost control can be achieved while maintaining a balance of the brake fluid and preventing the control hunting.

(10) The brake boost control apparatus further has the gate-out valve 3 which is installed between the master cylinder M/C and the suction side of the hydraulic pump P and controls the wheel cylinder pressure, and the control unit CU corrects the control quantity of the hydraulic pump P on the basis of a first wheel cylinder pressure (the wheel cylinder pressure estimated value based on the hydraulic pressure rigidity) that is estimated from the stroke amount of the brake operation member and a second wheel cylinder pressure (the wheel cylinder pressure estimated value based on the drive command) that is estimated from the pump operating state and the outside gate valve operating state.

Therefore, it is possible to operate the hydraulic pump P accurately, and achieve a stable boost control. In the first embodiment, the control quantity of the hydraulic pump P is corrected by correcting the target hydraulic pressure P*. However, it is not limited to this, and it is possible to directly correct the motor drive command value.

(11) The brake boost control apparatus further has the gate-out valve 3 which is installed between the master cylinder M/C and the suction side of the hydraulic pump P and controls the wheel cylinder pressure, and the control unit CU corrects the control quantity of the valve open amount of the gate-out valve 3 on the basis of a first wheel cylinder pressure (the wheel cylinder pressure estimated value based on the hydraulic pressure rigidity) that is estimated from the stroke amount detected by the brake stroke amount detection section (the stroke sensor SS) and a second wheel cylinder pressure (the wheel cylinder pressure estimated value based on the drive command) that is estimated from the pump operating state and the gate-out valve operating state.

Therefore, the boost control can be achieved while maintaining the relationship between the master cylinder pressure and the stroke amount at the predetermined relationship. In the first embodiment, the control quantity of the gate-out valve 3 is corrected by correcting the target hydraulic pressure P*. However, it is not limited to this, and it is possible to directly correct the gate-out valve drive command value.

(12) The control unit CU corrects the control quantity of the hydraulic pump P so that the relationship between the pressure detected by the pressure detection section (the pressure sensor PMC), the stroke amount detected by the brake stroke amount detection section (the stroke sensor SS), and the wheel cylinder pressure calculated from the pump operating state, the gate-out valve operating state and the stroke amount detected by the brake stroke amount detection section (the stroke sensor SS) is maintained at the predetermined relationship.

Therefore, the boost control can be achieved while maintaining the relationship between the master cylinder pressure and the stroke amount at the predetermined relationship. In the first embodiment, the motor drive command value is directly corrected. However, it is not limited to this, it is possible to correct the target hydraulic pressure P* or the target fluid amount Q*.

(13) The control unit CU corrects the valve open amount of the gate-out valve 3 so that the relationship between the pressure detected by the master cylinder pressure detection section (the pressure sensor PMC), the stroke amount detected by the brake stroke amount detection section (the stroke sensor SS), and the wheel cylinder pressure calculated from the pump operating state, the gate-out valve operating state and the stroke amount is maintained at the predetermined relationship.

Therefore, the boost control can be achieved while maintaining the relationship between the master cylinder pressure and the stroke amount at the predetermined relationship. In the first embodiment, the gate-out valve drive command value is directly corrected. However, it is not limited to this, it is possible to correct the target hydraulic pressure P* or the target fluid amount Q*.

(14) Although the configuration of the first embodiment has no boost mechanism 2, it is possible that the brake operation member (the brake pedal BP and/or the input rod 1) has the boost mechanism and the master cylinder M/C and the master cylinder M/C works through the boost mechanism then the pressure is produced in the brake fluid.

With this configuration, the double boost system or mechanism can be set.

(15) A brake boost control apparatus has a booster having the hydraulic pump P which draws the brake fluid from the master cylinder M/C and increases the pressure of the wheel cylinder in the vehicle at least at the driver's braking operation; a control valve (the gate-out valve 3) that controls the wheel cylinder pressure together with the hydraulic pump P; the control unit CU that controls the control quantities of the hydraulic pump P and the control valve (the gate-out valve 3) so that the stroke amount of the brake pedal BP when boosted by the booster and the master cylinder pressure are maintained at the predetermined relationship.

Therefore, the boost control can be achieved without providing the awkward feeling to the driver.

(16) The control valve includes the gate-out valve 3 which is installed between the master cylinder M/C and the suction side of the hydraulic pump P and controls the wheel cylinder pressure, and the control unit CU holds the wheel cylinder pressure when the master cylinder pressure lowers during the pressure increase control, and decreases the wheel cylinder pressure by controlling the valve open amount of the gate-out valve 3 when the master cylinder pressure lowers more than the predetermined value after starting the hold of the wheel cylinder pressure.

Therefore, the boost control can be achieved while maintaining a balance of the brake fluid and preventing the control hunting. Likewise, the hydraulic pressure control section holds the wheel cylinder pressure when the detected pressure (the master cylinder pressure) of the master cylinder pressure detection section (PMC) rises during the pressure decreasing operation of the wheel cylinder pressure by controlling the valve open amount of the gate-out valve 3, and increases the wheel cylinder pressure by operating the hydraulic pump P when the detected pressure (the master cylinder pressure) of the master cylinder pressure detection section (PMC) rises more than the predetermined value after starting the hold of the wheel cylinder pressure.

Therefore, the boost control can be achieved while maintaining a balance of the brake fluid and preventing the control hunting.

(17) The control valve includes the gate-out valve 3 which is installed between the master cylinder M/C and the suction side of the hydraulic pump P and controls the wheel cylinder pressure, and the control unit CU corrects the control quantity of the hydraulic pumpP on the basis of a first wheel cylinder pressure (the wheel cylinder pressure estimated value based on the hydraulic pressure rigidity) that is estimated from the stroke amount of the brake pedal BP and a second wheel cylinder pressure (the wheel cylinder pressure estimated value based on the drive command) that is estimated from the pump operating state and the gate-out valve operating state.

Therefore, it is possible to operate the hydraulic pump P accurately, and achieve a stable boost control. In the first embodiment, the control quantity of the hydraulic pump P is corrected by correcting the target hydraulic pressure P*. However, it is not limited to this, and it is possible to directly correct the motor drive command value.

(18) The control unit CU corrects the control quantity of the valve open amount of the gate-out valve 3 on the basis of a first wheel cylinder pressure (the wheel cylinder pressure estimated value based on the hydraulic pressure rigidity) that is estimated from the stroke amount of the brake pedal BP and a second wheel cylinder pressure (the wheel cylinder pressure estimated value based on the drive command) that is estimated from the pump operating state and the gate-out valve operating state.

Therefore, the boost control can be achieved while maintaining the relationship between the master cylinder pressure and the stroke amount at the predetermined relationship.

(19) The control unit CU corrects the control quantity of the hydraulic pump P so that the relationship between the master cylinder pressure, the stroke amount of the brake pedal BP, and the wheel cylinder pressure calculated from the pump operating state, the gate-out valve operating state and the stroke amount of the brake pedal BP is maintained at the predetermined relationship. Therefore, the boost control can be achieved while maintaining the relationship between the master cylinder pressure and the stroke amount at the predetermined relationship. In the first embodiment, the motor drive command value is directly corrected. However, it is not limited to this, it is possible to correct the target hydraulic pressure P* or the target fluid amount Q*.

(20) The control unit CU corrects the valve open amount of the gate-out valve 3 so that the relationship between the master cylinder pressure, the stroke amount of the brake pedal BP, and the wheel cylinder pressure calculated from the pump operating state, the gate-out valve operating state and the stroke amount of the brake pedal BP is maintained at the predetermined relationship.

Therefore, the boost control can be achieved while maintaining the relationship between the master cylinder pressure and the stroke amount at the predetermined relationship. In the first embodiment, the gate-out valve drive command value is directly corrected. However, it is not limited to this, it is possible to correct the target hydraulic pressure P* or the target fluid amount Q*.

(21) Although the configuration of the first embodiment has no boost mechanism 2, it is possible that the brake operation member (the brake pedal BP and/or the input rod 1) has the boost mechanism and the master cylinder M/C and the master cylinder M/C works through the boost mechanism then the pressure is produced in the brake fluid.

With this configuration, the double boost system or mechanism can be set.

(22) A brake boost control apparatus has a brake operation member by which the driver performs the braking operation; the master cylinder M/C which is connected with the brake operation member and produces the pressure in the brake fluid; the wheel cylinder W/C which is installed at each wheel and produces the braking force to the wheel by the brake fluid in the master cylinder M/C; the hydraulic pump P which draws the brake fluid from the master cylinder M/C and discharges the brake fluid to the wheel cylinder side; a master cylinder pressure detection section or means (PMC) which is installed between the master cylinder M/C and the suction side of the hydraulic pump P and detects the pressure of the brake fluid which is produced by the operation of the brake operation member; a brake stroke amount detection section or means (SS) that detects the stroke amount of the brake operation member; a hydraulic pressure control section or means (the gate-out valve 3) that controls the pressure of the wheel cylinder W/C together with the hydraulic pump P; a boost section or means which boosts the pressure of the brake fluid which is produced by the master cylinder M/C by the hydraulic pump P and increases the wheel cylinder pressure; and a control unit CU that controls the hydraulic pump P when increasing the wheel cylinder pressure and controls the hydraulic pressure control section (the gate-out valve 3) when decreasing the wheel cylinder pressure so that the stroke amount detected by the brake stroke amount detection section (SS) under the boost operation by the boost section and the pressure detected by the master cylinder pressure detection section (PMC) are maintained at the predetermined relationship.

Therefore, the boost control can be achieved while preventing the control hunting without providing the awkward feeling to the driver.

(23) A brake boost control apparatus has a booster having the hydraulic pump P which draws a brake fluid from the master cylinder M/C and increases the pressure of the wheel cylinder in the vehicle at least at the driver's braking operation; a control valve (the gate-out valve 3) that controls the wheel cylinder pressure together with the hydraulic pump P; the control unit CU that controls the hydraulic pump P when increasing the wheel cylinder pressure and controls the control quantity of the control valve (the gate-out valve 3) when decreasing the wheel cylinder pressure so that the stroke amount of the brake pedal BP when boosted by the booster and the master cylinder pressure are maintained at the predetermined relationship.

Therefore, the boost control can be achieved while preventing the control hunting without providing the awkward feeling to the driver.

(24) The brake boost control apparatus further has the first brake circuit (the pipe 13) that connects the master cylinder M/C and the wheel cylinder W/C; the second brake circuit (the pipe 12) that connects the pipe 13 and the suction side of the hydraulic pump P through the check valve (the check valve 7) that allows only the flow of the brake fluid in the direction toward the pipe 13; the normally-open gate-out valve 3 which is installed on the pipe 13 and positioned between the connecting point of the pipes 13, 12 and the master cylinder M/(-; a third brake circuit (the pipe 11) that connects a point positioned between the gate-out valve 3 and the master cylinder M/C on the pipe 13 and the suction side of the hydraulic pump P; the normally-open solenoid-in valve 4 which is installed on the pipe 13 and positioned between the connecting point of the pipes 13, 12 and the wheel cylinder W/C; a fourth brake circuit (the pipe 14) that connects a point positioned between the solenoid-in valve 4 and the wheel cylinder W/C on the pipe 13 and the suction side of the hydraulic pump P; the normally-closed solenoid-out valve 5 that is installed on the pipe 14; and the reservoir 16 which is installed on the pipe 14 and positioned between the solenoid-out valve 5 and the suction side of the hydraulic pump P.

That is, the above configuration is the same as a configuration of a brake unit that is capable of performing an existing vehicle behavior control and an anti-skid control. By only performing the pressure difference control of the gate-out valve 3 in this existing configuration, it is possible to provide the brake boost control apparatus. Thus, a cost-reduction by removing the negative pressure booster can be realized, and also removing the negative pressure booster facilitates the installation of the brake boost control apparatus. Furthermore, the brake boost control apparatus is applied to the vehicle behavior control.

Here, the vehicle behavior control is the well-known control in which an actual yaw rate is detected by a yaw rate sensor and a target yaw rate is fixed using a steering angle sensor etc. then a braking force is provided to only a certain wheel so that the actual yaw rate becomes this target yaw rate. On the other hand, the anti-skid control is the well-known control in which slip ratio etc. are calculated from a relationship between a pseudo-vehicle speed and a wheel speed and then the pressure increase/decrease control of the wheel cylinder is carried out using the solenoid-in valve 4 and the solenoid-out valve 5 so that the slip ratio becomes a desired value.

Second Embodiment

Figure 12:
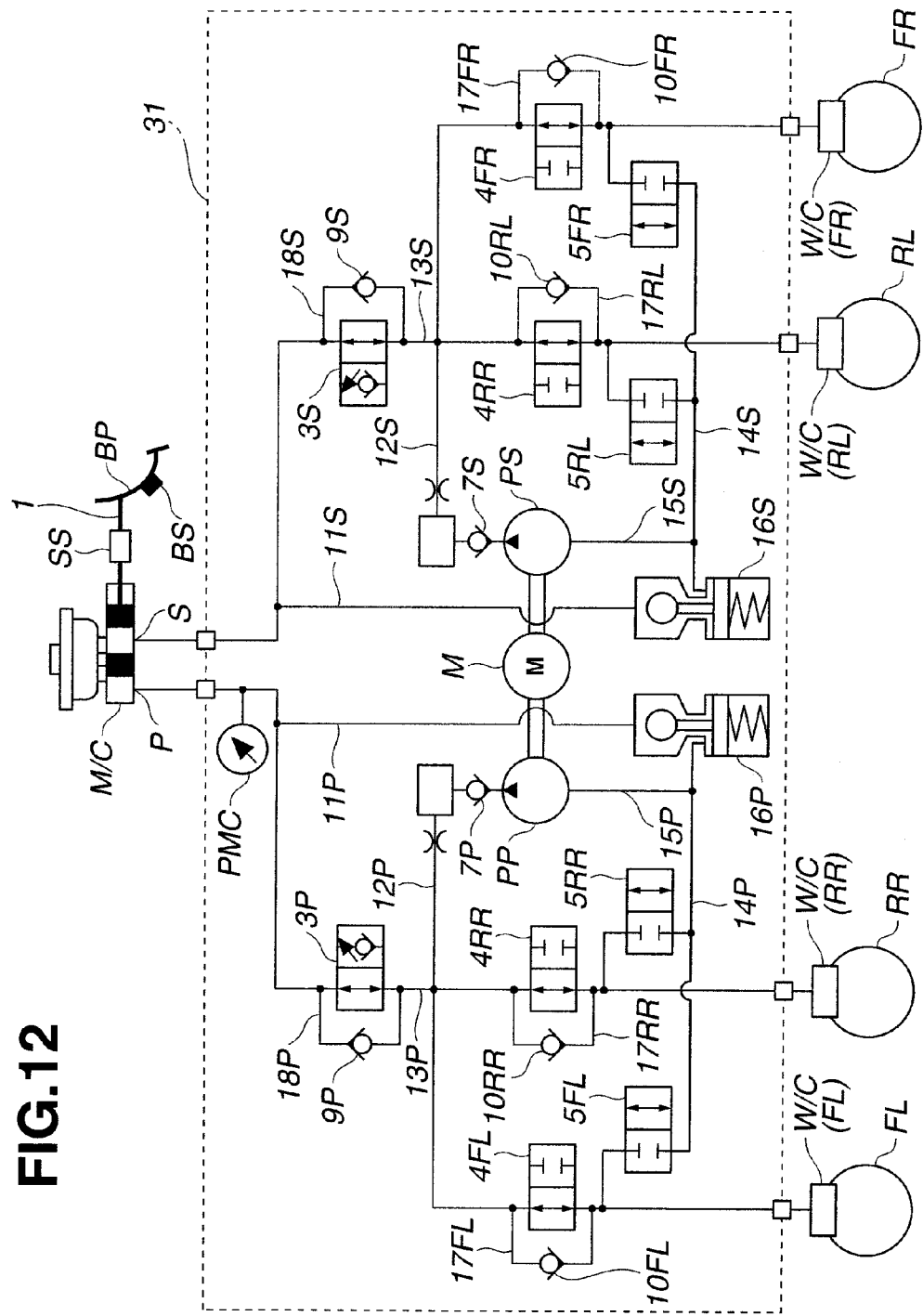
FIG. 12 is a hydraulic circuit of a brake system using a brake boost control apparatus of a second embodiment.

Next, a second embodiment will be explained. The configuration of the second embodiment is almost same as the first embodiment, thus only different points will be explained. FIG. 12 is a hydraulic circuit of the brake system using a brake boost control apparatus of the second embodiment. In the second embodiment, the check valves 6 and 8 installed at the suction side of the hydraulic pump P in the first embodiment are removed, and then the reservoir 16 has the check valve. In addition, because of this change of the configuration, the gate-in valve 2 is also removed.

In the configuration of the second embodiment, no drive command for the gate-in valve 2 is output. This point is different from the first embodiment. The control except this point is the same as the first embodiment, thus its explanation is omitted here. Even the above configuration can obtain the same working, function and effects as the first embodiment.

Third Embodiment

Figure 13:
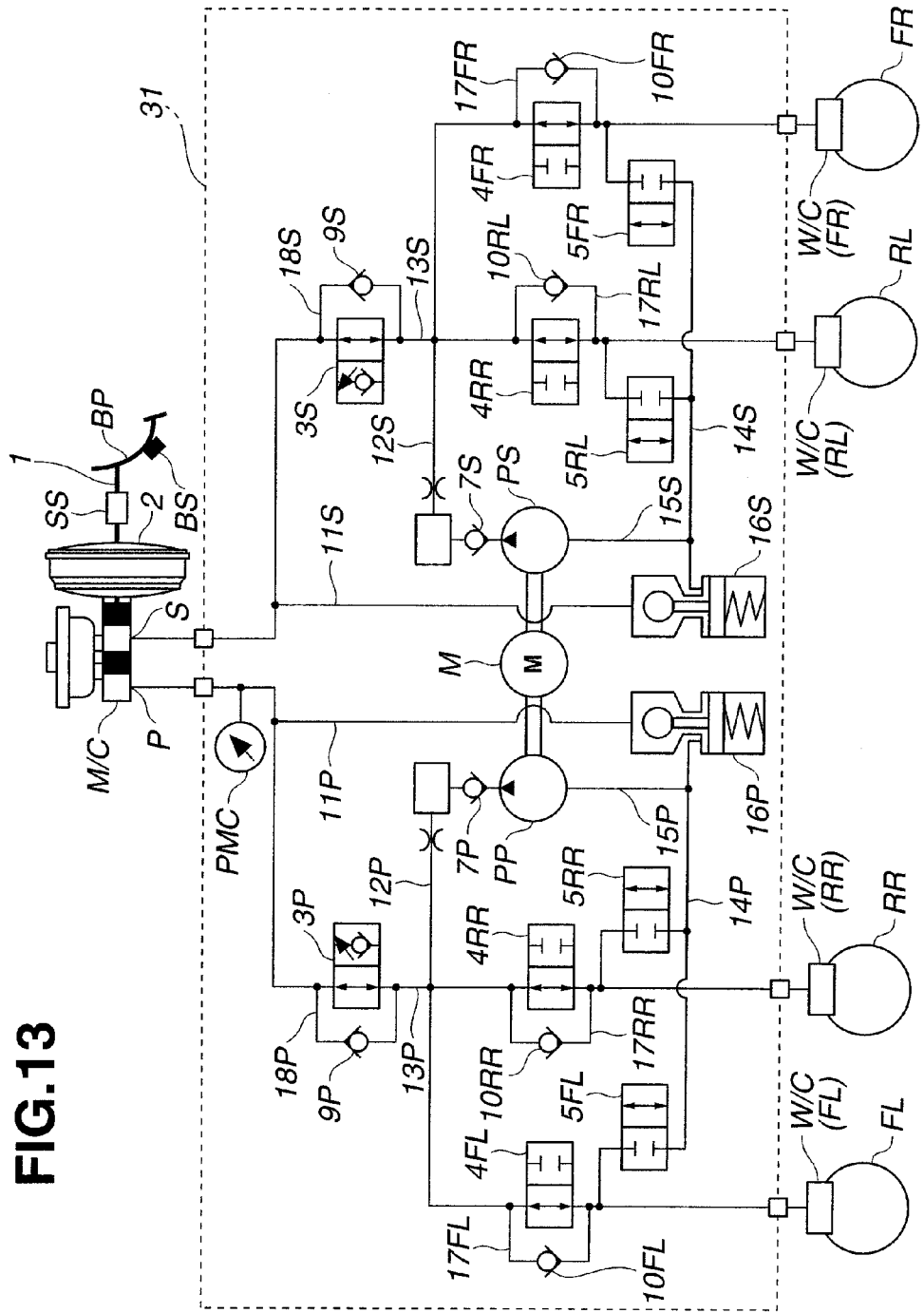
FIG. 13 is a hydraulic circuit of a brake system using a brake boost control apparatus of a third embodiment.

Next, a third embodiment will be explained. FIG. 13 is a hydraulic circuit of the brake system using a brake boost control apparatus of the third embodiment. The configuration of the third embodiment is basically same as the second embodiment. However, a boost mechanism 2 which is capable of providing an assist force to a brake operation member 1 is installed. This point is different from the second embodiment. With this configuration, a double boost system or mechanism is installed, and further the same working, function and effects as the first embodiment can be obtained.

Although the each embodiment has been explained above, the brake boost control apparatus of the present invention could be mounted on a hybrid vehicle as well. In this case, there is a need to remove a braking force that acts on the drive road wheels during a regenerative braking operation. At this time, since the wheel cylinder pressure can be set freely, if a boost ratio is controlled appropriately so that the wheel cylinder pressure becomes low in accordance with a regenerative braking force (the target hydraulic pressure is set to be low), the boost control can be achieved without providing the awkward feeling to the driver.

Furthermore, although the brake circuits that act on the four wheels have been explained, the present invention can be also applied to a brake circuit that acts on only front wheels or only rear wheels.

This application is based on a prior Japanese Patent Application No. 2007-266090 filed on Oct. 12, 2007. The entire contents of this Japanese Patent Application No. 2007-266090 are hereby incorporated by reference.

Although the invention has been described above by reference to certain embodiments of the invention, the invention is not limited to the embodiments described above. Modifications and variations of the embodiments described above will occur to those skilled in the art in light the above teachings. The scope of the invention is defined with reference to the following claims.

What is claimed is:

1. A brake boost control apparatus comprising:
a brake operation member by which a driver performs a braking operation;
a master cylinder which is connected with the brake operation member and produces a pressure in a brake fluid;
a wheel cylinder which is installed at each wheel and produces a braking force to the wheel by the brake fluid in the master cylinder;
a hydraulic pump which draws the brake fluid from the master cylinder and discharges the brake fluid to a wheel cylinder side;
a master cylinder pressure detection section which is installed between the master cylinder and a suction side of the hydraulic pump and detects a pressure of the brake fluid which is produced by the operation of the brake operation member;
a brake stroke amount detection section that detects a stroke amount of the brake operation member;
a hydraulic pressure control section that controls a pressure of the wheel cylinder together with the hydraulic pump;
a boost section which boosts the pressure of the brake fluid, produced by the master cylinder, by the hydraulic pump and increases the wheel cylinder pressure; and
a control unit that controls at least one of the hydraulic pump and the hydraulic pressure control section so that the stroke amount detected by the brake stroke amount detection section under a boost operation by the boost section and the pressure detected by the master cylinder pressure detection section are maintained at a predetermined relationship, wherein:
the hydraulic pressure control section has an outside gate valve which is installed between the master cylinder and a discharge side of the hydraulic pump and controls the wheel cylinder pressure, and
the control unit corrects a control quantity of the hydraulic pump on the basis of a first wheel cylinder pressure that is estimated from the stroke amount detected by the brake stroke amount detection section and a second wheel cylinder pressure that is estimated from a pump operating state and an outside gate valve operating state.

2. The brake boost control apparatus as claimed in claim 1, wherein:
the control unit corrects the control quantity of the hydraulic pump so that a relationship between the pressure detected by the master cylinder pressure detection section, the stroke amount detected by the brake stroke amount detection section, and the wheel cylinder pressure calculated from the pump operating state, the outside gate valve operating state and the stroke amount is maintained at a predetermined relationship.

3. A brake boost control apparatus comprising:
a brake operation member by which a driver performs a braking operation;
a master cylinder which is connected with the brake operation member and produces a pressure in a brake fluid;
a wheel cylinder which is installed at each wheel and produces a braking force to the wheel by the brake fluid in the master cylinder;
a hydraulic pump which draws the brake fluid from the master cylinder and discharges the brake fluid to a wheel cylinder side;
a master cylinder pressure detection section which is installed between the master cylinder and a suction side of the hydraulic pump and detects a pressure of the brake fluid which is produced by the operation of the brake operation member;
a brake stroke amount detection section that detects a stroke amount of the brake operation member;
a hydraulic pressure control section that controls a pressure of the wheel cylinder together with the hydraulic pump;

a boost section which boosts the pressure of the brake fluid, produced by the master cylinder, by the hydraulic pump and increases the wheel cylinder pressure; and a control unit that controls at least one of the hydraulic pump and the hydraulic pressure control section so that the stroke amount detected by the brake stroke amount detection section under a boost operation by the boost section and the pressure detected by the master cylinder pressure detection section are maintained at a predetermined relationship, wherein:

the hydraulic pressure control section has an outside gate valve which is installed between the master cylinder and a discharge side of the hydraulic pump and controls the wheel cylinder pressure, and the control unit corrects a control quantity of a valve open amount of the outside gate valve on the basis of a first wheel cylinder pressure that is estimated from the stroke amount detected by the brake stroke amount detection section and a second wheel cylinder pressure that is estimated from a pump operating state and an outside gate valve operating state.

4. The brake boost control apparatus as claimed in claim 3, wherein:

the control unit corrects the valve open amount of the outside gate valve so that a relationship between the pressure detected by the master cylinder pressure detection section, the stroke amount detected by the brake stroke amount detection section, and the wheel cylinder pressure calculated from the pump operating state, the outside gate valve operating state and the stroke amount is maintained at a predetermined relationship.

5. A brake boost control apparatus comprising:

a brake operation member that works by a driver's braking operation;

a master cylinder which works by the brake operation member and produces a pressure in a brake fluid;

a wheel cylinder which is installed at each wheel and produces a braking force to the wheel;

a hydraulic pump which is used for a pressure increase control of the wheel cylinder by drawing the brake fluid from the master cylinder and discharging the brake fluid to a wheel cylinder side;

a pressure detection section which is installed between the master cylinder and a suction side of the hydraulic pump and detects a pressure of the brake fluid which is produced by the brake operation member;

a brake stroke amount detection section which is installed between the brake operation member and the master cylinder and detects a stroke amount of the brake operation member;

a boost section which boosts the pressure of the brake fluid, produced by the brake operation member, by the hydraulic pump and increases the wheel cylinder pressure; and a control unit that selectively changes wheel cylinder pressure of one of the pressure increase control, a hold control and a pressure decrease control on the basis of the stroke amount detected by the brake stroke amount detection section under a boost operation by the boost section and the pressure of the brake fluid detected by the pressure detection section; and an outside gate valve which is installed between the master cylinder and a discharge side of the hydraulic pump and controls the wheel cylinder pressure, and wherein:

the control unit corrects a control quantity of the hydraulic pump on the basis of a first wheel cylinder pressure that is estimated from the stroke amount of the brake operation member and a second wheel cylinder pressure that is estimated from a pump operating state and an outside gate valve operating state.

6. The brake boost control apparatus as claimed in claim 5, wherein:

the control unit corrects the control quantity of the hydraulic pump so that a relationship between the pressure detected by the pressure detection section, the stroke amount detected by the brake stroke amount detection section, and the wheel cylinder pressure calculated from the pump operating state, the outside gate valve operating state and the stroke amount detected by the brake stroke amount detection section is maintained at a predetermined relationship.

7. A brake boost control apparatus comprising:

a brake operation member that works by a driver's braking operation;

a master cylinder which works by the brake operation member and produces a pressure in a brake fluid;

a wheel cylinder which is installed at each wheel and produces a braking force to the wheel;

a hydraulic pump which is used for a pressure increase control of the wheel cylinder by drawing the brake fluid from the master cylinder and discharging the brake fluid to a wheel cylinder side;

a pressure detection section which is installed between the master cylinder and a suction side of the hydraulic pump and detects a pressure of the brake fluid which is produced by the brake operation member;

a brake stroke amount detection section which is installed between the brake operation member and the master cylinder and detects a stroke amount of the brake operation member;

a boost section which boosts the pressure of the brake fluid, produced by the brake operation member, by the hydraulic pump and increases the wheel cylinder pressure; and a control unit that selectively changes wheel cylinder pressure of one of the pressure increase control, a hold control and a pressure decrease control on the basis of the stroke amount detected by the brake stroke amount detection section under a boost operation by the boost section and the pressure of the brake fluid detected by the pressure detection section; and an outside gate valve which is installed between the master cylinder and a discharge side of the hydraulic pump and controls the wheel cylinder pressure, and wherein:

the control unit corrects a control quantity of a valve open amount of the outside gate valve on the basis of a first wheel cylinder pressure that is estimated from the stroke amount detected by the brake stroke amount detection section and a second wheel cylinder pressure that is estimated from a pump operating state and an outside gate valve operating state.

8. The brake boost control apparatus as claimed in claim 7, wherein:

the control unit corrects the valve open amount of the outside gate valve so that a relationship between the pressure detected by the master cylinder pressure detection section, the stroke amount detected by the brake stroke amount detection section, and the wheel cylinder pressure calculated from the pump operating state, the outside gate valve operating state and the stroke amount is maintained at a predetermined relationship.

9. A brake boost control apparatus comprising:
a booster having a hydraulic pump which draws a brake fluid from a master cylinder and increases a pressure of a wheel cylinder in a vehicle at least at a driver's braking operation;
a control valve that controls the wheel cylinder pressure together with the hydraulic pump; and
a control unit that controls control quantities of the hydraulic pump and the control valve so that a stroke amount of a brake pedal when boosted by the booster and a master cylinder pressure are maintained at a predetermined relationship, wherein:
the control valve includes an outside gate valve which is installed between the master cylinder and a discharge side of the hydraulic pump and controls the wheel cylinder pressure, and p1 the control unit corrects the control quantity of the hydraulic pump on the basis of a first wheel cylinder pressure that is estimated from the stroke amount of the brake pedal and a second wheel cylinder pressure that is estimated from a pump operating state and an outside gate valve operating state.

10. The brake boost control apparatus as claimed in claim 9, wherein:
the control unit corrects a control quantity of a valve open amount of the outside gate valve on the basis of a first wheel cylinder pressure that is estimated from the stroke amount of the brake pedal and a second wheel cylinder pressure that is estimated from a pump operating state and an outside gate valve operating state.

11. The brake boost control apparatus as claimed in claim 10, wherein:
the control unit corrects the control quantity of the hydraulic pump so that a relationship between the master cylinder pressure, the stroke amount of the brake pedal, and the wheel cylinder pressure calculated from the pump operating state, the outside gate valve operating state and the stroke amount of the brake pedal is maintained at a predetermined relationship.

12. The brake boost control apparatus as claimed in claim 10, wherein:
the control unit corrects the valve open amount of the outside gate valve so that a relationship between the master cylinder pressure, the stroke amount of the brake pedal, and the wheel cylinder pressure calculated from the pump operating state, the outside gate valve operating state and the stroke amount of the brake pedal is maintained at a predetermined relationship.

\* \* \* \* \*